US008233298B2

(12) United States Patent
Jang et al.

(10) Patent No.: US 8,233,298 B2
(45) Date of Patent: Jul. 31, 2012

(54) POWER FACTOR CORRECTION RECTIFIER THAT OPERATES EFFICIENTLY OVER A RANGE OF INPUT VOLTAGE CONDITIONS

(75) Inventors: Yungtaek Jang, Cary, NC (US); Milan M. Jovanović, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 455 days.

(21) Appl. No.: 12/479,430

(22) Filed: Jun. 5, 2009

(65) Prior Publication Data

US 2009/0303762 A1   Dec. 10, 2009

Related U.S. Application Data

(60) Provisional application No. 61/059,087, filed on Jun. 5, 2008.

(51) Int. Cl.
*H02M 7/04* (2006.01)
(52) U.S. Cl. .......................................................... 363/67
(58) Field of Classification Search .................... 363/61, 363/65, 67–69, 71
See application file for complete search history.

(56) References Cited

U.S. PATENT DOCUMENTS

| | | | | | |
|---|---|---|---|---|---|
| 5,119,283 | A | * | 6/1992 | Steigerwald et al. | 363/37 |
| 5,734,562 | A | | 3/1998 | Redl | |
| 5,847,949 | A | * | 12/1998 | Jiang | 363/65 |
| 5,982,638 | A | * | 11/1999 | Tang et al. | 363/21.1 |
| 6,487,098 | B2 | | 11/2002 | Malik et al. | |
| 6,650,095 | B2 | * | 11/2003 | Aiello et al. | 323/267 |
| 7,075,193 | B2 | * | 7/2006 | Yang et al. | 307/66 |
| 7,283,379 | B2 | * | 10/2007 | Baker et al. | 363/98 |
| 7,957,168 | B2 | * | 6/2011 | Zacharias et al. | 363/132 |
| 7,973,494 | B2 | * | 7/2011 | Yao et al. | 315/291 |
| 8,058,752 | B2 | * | 11/2011 | Erickson et al. | 307/150 |
| 2008/0061628 | A1 | * | 3/2008 | Nielsen et al. | 307/66 |
| 2009/0261744 | A1 | * | 10/2009 | Chen et al. | 315/199 |
| 2009/0268496 | A1 | * | 10/2009 | Tan et al. | 363/126 |
| 2009/0290384 | A1 | * | 11/2009 | Jungreis | 363/17 |

FOREIGN PATENT DOCUMENTS

WO   WO-2007/105189 A1   9/2007

OTHER PUBLICATIONS

G. Spiazzi, "Analysis of Buck Converters Used as Power Factor Preregulators", IEEE Power Electronics Specialists Conf. (PESC) Proc., pp. 564-570, 1997.

* cited by examiner

*Primary Examiner* — Adolf Berhane
(74) *Attorney, Agent, or Firm* — Venable LLP; Robert S. Babayi; Christopher Ma

(57) ABSTRACT

A PFC rectifier comprises a first converter having a first output capacitor and a second converter having a second output capacitor. The first and second capacitors are coupled to each other to increase the output voltage of the PFC rectifier. For example the first or second output capacitors can be serially coupled to each other. At least one or both of the first or second converters comprise buck or buck-boost converters, including inverting or non-inverter buck converters. The first and second converters can also form a bi-directional ac-ac inverter.

16 Claims, 49 Drawing Sheets

POWER FACTOR CORRECTION RECTIFIER THAT OPERATES EFFICIENTLY OVER A RANGE OF INPUT VOLTAGE CONDITIONS

CROSS-REFERENCE TO RELATED APPLICATIONS

This Non-provisional Application claims the benefit of U.S. Provisional Application Ser. No. 61/059,087, filed Jun. 5, 2008, titled "A Power Factor Correction Rectifier that Operates Efficiently Over A Range of Input Voltage Conditions", which is incorporated by reference herein in its entirety.

FIELD OF THE INVENTION

This invention relates to the power factor correction (PFC) front-end rectifier, and more particularly to a PFC rectifier with improved efficiency over a wide input voltage range, including improved efficiency from a minimum low line input voltage to a maximum high line input voltage.

DESCRIPTION OF THE PRIOR ART

In the field of power supplies, low line voltage refers to a nominal input AC voltage of 110 volts for power supplies operating in one part of the world, e.g., the US, and high line voltage refers to a nominal input voltage of 220 volts for power supplies operating in other parts of the world, e.g., Europe. Generally, power supplies are designed to operate with input voltages that range from a minim to a maximum of low line and high line voltages, with all voltages being expressed in root mean square (RMS) values. With the nominal value of 110 volts for low line input voltage, the minimum and maximum low line voltages are specified at 85 and 150 volts, respectively, and with the nominal value of 220 volts for high line input voltage, the minimum and maximum high line voltages are specified at 175 and 265 volts, respectively.

A power factor corrector (PFC) rectifier is a circuit that controls the amount of current power drawn by a load in order to obtain a power factor as close as possible to unity. In most applications, the circuit controls the input current of the rectifier load so that the input current waveform is proportional to the input voltage waveform. Known PFC rectifiers could be active or passive. A simple passive PFC rectifier can be an inductor that removes load current spikes, thereby suppressing undesired harmonics. Active PFC rectifiers usually incorporates a diode rectifier and either one of a boost, buck or buck-boost converter.

Generally, a rectifier that processes electric energy from one voltage to the other voltage generally shows best efficiency when the input and output voltages are equal because the converter does not need to store or circulate extra energy to increase or decrease the output voltage.

Various regulations govern the amount of generated harmonics by a power supply based on its efficiency, with high power supplies (e.g., greater than 500 W) having more stringent efficiency requirements compared to low power supplies (e.g., between 60 W to 500 W). A rectifier that processes electric energy from one voltage to the other voltage generally shows best efficiency when the input and output voltages are equal because the converter does not need to store or circulate extra energy to increase or decrease the output voltage.

A commonly used active PFC rectifier is a bridge diode rectifier followed by a boost converter. It has been dominantly used in off-line ac-dc applications for decades because of its simplicity and good PFC performance. However, a drawback of the PFC boost rectifier is significantly low efficiency at minim low line input voltage, e.g., around 85 volts. Since the output voltage of a boost converter is higher than its peak input voltage, the output voltage is designed to be greater than the peak voltage of the maximum high line voltage, e.g., 265 volts, usually in the range of 400 volts. As a result, the difference between input and output voltages is large when the boost rectifier operates at maximum high line voltage. Consequently, the boost converter needs to store and circulate extra energy to increase the voltage, which results in significant losses and lower efficiency at minimum low line voltage. In addition, a converter generally has higher conduction losses when it operates at low line since the magnitude of input current is inversely proportional to the input voltage to process the equal power. As a result, a PFC boost rectifier shows significantly lower efficiency at low line than that at high line input voltages. Indeed, a PFC boost rectifier with a nominal 400 volt output can operates at 98% efficiency with a maximum high line input voltage. The same rectifier on the other hand operates at an efficiency as low as 92%. As a result, the PFC boost rectifier must be designed to accommodate high thermal dissipations at 92% efficiency, which can increase its cost.

In order to increase low line efficiency, a PFC rectifier having a buck converter is used. One such rectifier is shown in FIG. 1. Because the output voltage of a buck converter is lower than its input voltage, the PFC buck rectifier can be designed to have an output voltage that is be closer to the input voltage at the minimum low line voltage. Thus, the buck converter does not need to store or circulate excessive energy at low line, thereby increasing its efficiency. Moreover, the efficiency may not be degraded at high line since its input current is smaller than that at low line input voltage.

Although, the lower output voltage produced by a buck PFC rectifier benefits efficiency, it also provides a disadvantage by reducing energy storage capability, which an off-line power supply needs to maintain its output within the specified time period after a drop-out of the line voltage. The required energy to support the output during the specified time is obtained from the properly sized energy-storage capacitor and its voltage. Since the stored energy is proportional to the square of the voltage across the capacitor, the low output voltage of the PFC buck rectifier significantly limits the useable energy during the specified time. Moreover, it is advantageous to increase the output voltage of the PFC buck rectifier to accommodate interfacing the rectifier with the subsequent stage, i.e., a secondary stages, which generally operate with higher voltage components. It is known to increase the output voltage of and reduce bridge rectifier losses by a simple voltage doubler, such as the one shown in FIG. 2. However, the voltage doubler of FIG. 2 is not suitable for applications that require PFC.

Therefore, there exists a need for a more efficient PFC rectifier that operates over a wide range of input line voltages with a sufficiently large output voltage that makes it suitable for use in off-line power supplies.

SUMMARY OF THE INVENTION

Briefly, according to the present invention, a PFC rectifier comprises a first converter having a first output capacitor and a second converter having a second output capacitor. The first and second capacitors are coupled to each other to increase the output voltage of the PFC rectifier. For example the first or second output capacitors can be serially coupled to each other. At least one or both of the first or second converters comprise buck or buck-boost converters, including inverting or non-inverter buck converters. The first and second converters can also form a bi-directional ac-ac inverter.

According to some of the more detailed features of the invention, the first and second converters share a common inductor. The common inductor can be serially coupled to one of the first or second output capacitors. The first convert has a first inductor and the second converter has a second inductor that is magnetically coupled to the first inductor. In one embodiment, the first and second converters have first and second input diodes and first and second switches that form a bi-directional switch. The first or second converters can also include reverse voltage blocking switch devices. The bi-directional switch can be coupled to a common inductor shared by the first and second converters. The first or second diodes can also be paralleled by a snubber capacitor.

According to other more detailed features of the invention, the PFC rectifier can be configured to have a linear input-to-output voltage gain or nonlinear input-to-output voltage gain. A selection switch allows the PFC rectifier to operate in either a nonlinear input-to-output voltage gain mode or linear input-to-output voltage gain mode.

According to still other more detailed features of the invention, the first output capacitor is coupled to a first output voltage sensor and the second output capacitor is coupled to a second output voltage sensor for controlling switching in at least one of the first and second converters. The rectifier of the invention can also include a DC-DC converter having an input coupled to the first output capacitor and an output coupled to the second output capacitor.

DETAILED DESCRIPTION OF THE INVENTION

A PFC rectifier according to the present invention offers maximized low line efficiencies without the limitations of prior-art techniques are described. According to the present invention, a system and method that substantially improves the efficiency at low line is provided. Moreover, the proposed system and method increases the rectifier output voltage and reduces the number of the input bridge diodes.

Figure 1:
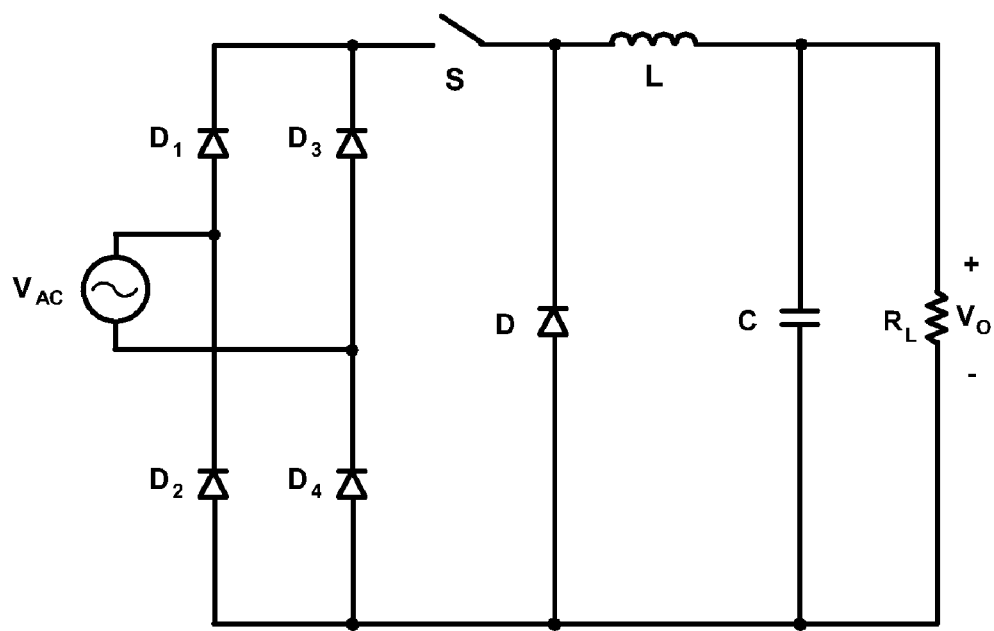
FIG. 1 shows a conventional PFC buck rectifier.
Figure 2:
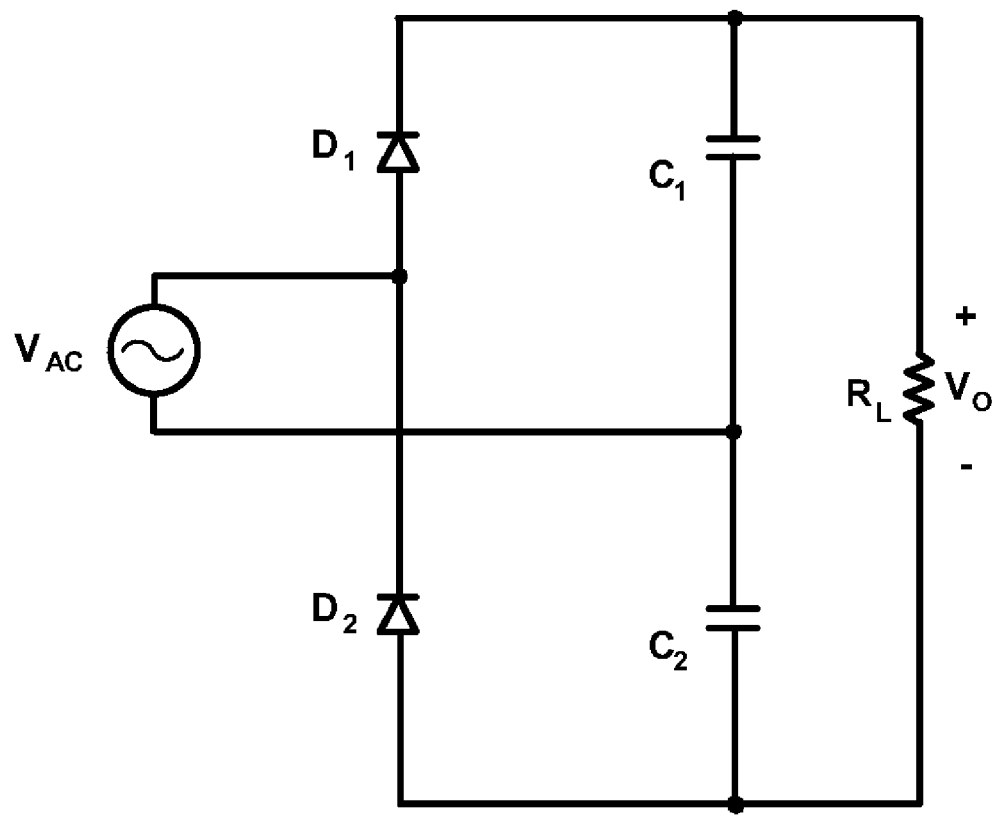
FIG. 2 shows a conventional voltage-doubler rectifier.
Figure 3:
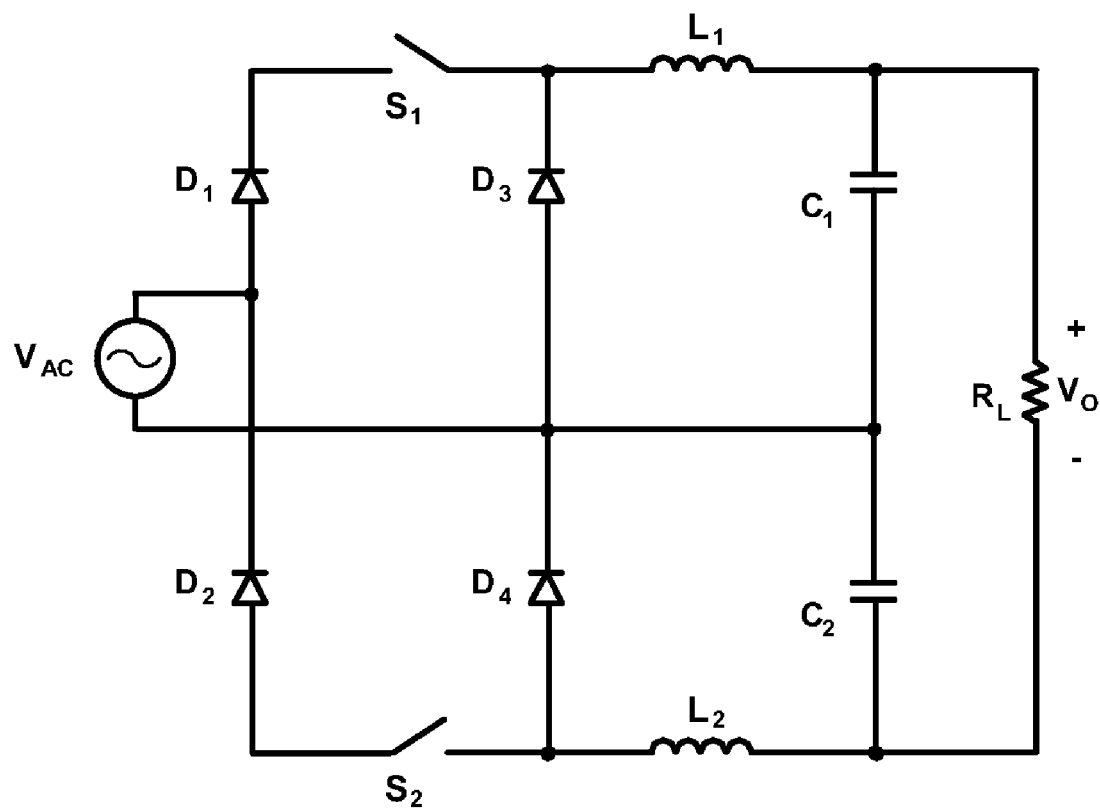
FIG. 3 shows a PFC rectifier according to one embodiment of the present invention.

Referring to FIG. 3, the PFC rectifier according to one exemplary embodiment If the present invention comprises a first converter, a second converter, and a voltage multiplier, such as a voltage doubler comprising two serially coupled capacitors. The converters have corresponding first and second switching circuits and inductors. Examples of the first and second converters include buck and buck-boost converters. The first converter couples an input ac source to one capacitor. The second converter couples the input ac source to the other capacitor. In one embodiment, the first converter comprises a buck converter having a first switch and a first input diode in series to allow an input-to-output positive current that flows from a first terminal of an input ac source to a terminal of the first series capacitor through a first inductor. The cathode of a first freewheeling diode is connected to the node between the first switch and the first inductor while the anode of the freewheeling diode is connected to the second terminal of the input ac source. The second terminal of the input ac source is also connected to the other terminal of the first series capacitor. The second converter comprises an inverted buck converter having a second switch and a second input diode in series to allow an input-to-output negative current to flow from a terminal of the second series capacitor to the first terminal of the input ac source through a second inductor. In one embodiment, the firs and second inductors may be magnetically coupled to each other. The anode of a second freewheeling diode is connected to the node between the second switch and the second inductor while the cathode of the freewheeling diode is connected to the second terminal of the input ac source and the other terminal of the second series capacitor. In one exemplary embodiment, the first switch and the first input diode is replaced by a unidirectional switch while the second switch and the second input diode is replaced by another unidirectional switch.

In another embodiment, the rectifier of the present invention has a nonlinear input-to-output voltage gain. Under this arrangement, the anode of the first freewheeling diode is connected to the node between the second inductor and the second series capacitor while the cathode of the second freewheeling diode is connected to the node between the first inductor and the first series capacitor. In yet another embodiment, nonlinear input-to-output voltage gain is derived from the node between the first and second capacitors being connected through an additional selection switch to the rest of the circuit. In still another embodiment, the first switch and the second switch are serially coupled between one of the ac input source terminals and a node between the first and second input diodes.

As stated above, a PFC rectifier according to the present invention employs at least two converters each having a corresponding output capacitor. In one embodiment, the two converters comprise buck converters, each being active during one half line cycle of an ac input voltage. Each output capacitor of the buck converter is serially connected. As shown in FIG. 3, the first buck converter comprises input diode $D_1$, switch $S_1$, inductor $L_1$, freewheeling diode $D_3$, and output capacitor $C_1$. The first buck converter operates only when the input ac voltage $V_{AC}$ is positive, i.e., the voltage potential at the node between the anode of input diode $D_1$ and the cathode of input diode $D_2$ is higher than the voltage potential at the node between the anode of freewheeling diode $D_3$ and the cathode of freewheeling diode $D_4$. The voltage across capacitor $C_1$ is regulated by a pulse-width-modulated switch $S_1$. The voltage across capacitor $C_1$ is lower than the peak voltage of input ac source $V_{AC}$. The second buck converter comprises input diode $D_2$, switch $S_2$, inductor $L_2$, freewheeling diode $D_4$, and output capacitor $C_2$. The second buck converter operates only when the input ac voltage $V_{AC}$ is negative, i.e., the voltage potential at the node between the anode of input diode $D_1$ and the cathode of input diode $D_2$ is lower than the voltage potential at the node between the anode of freewheeling diode $D_3$ and the cathode of freewheeling diode $D_4$. The voltage across capacitor $C_2$ is regulated by a pulse-width-modulated switch $S_2$. The voltage across capacitor $C_2$ is lower than the peak voltage of input ac source $V_{AC}$.

Figure 4:
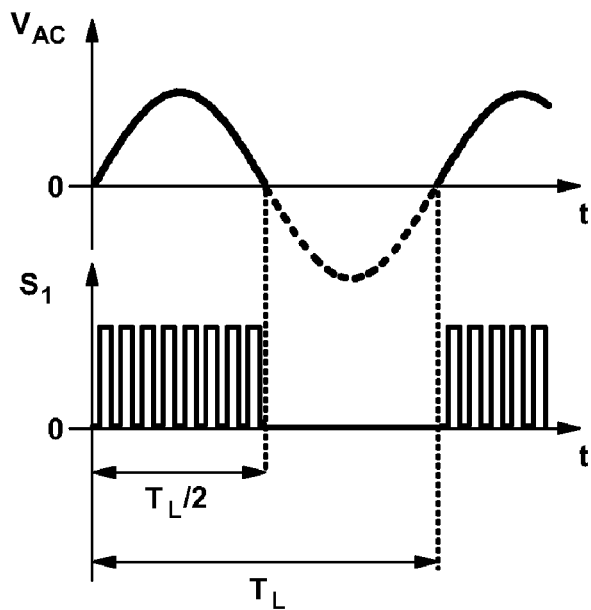
FIG. 4 depicts the operation of the PFC rectifier of FIG. 3 during the period when the line voltage is positive.
Figure 4:
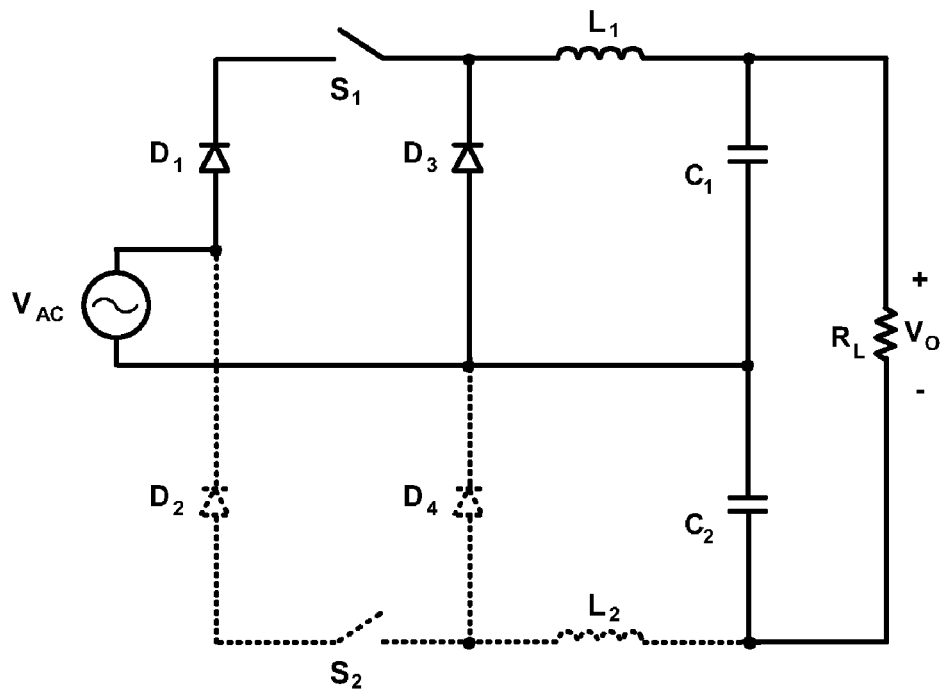
Figure 5:
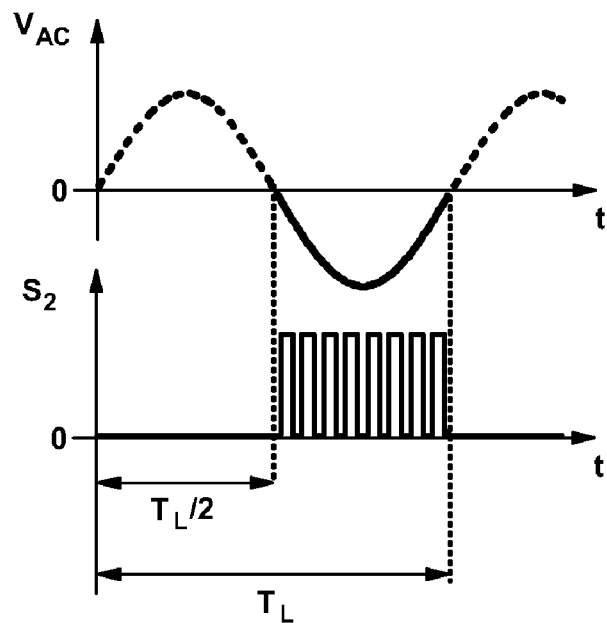
FIG. 5 depicts the operation of the PFC rectifier of FIG. 3 during the period when the line voltage is negative.
Figure 5:
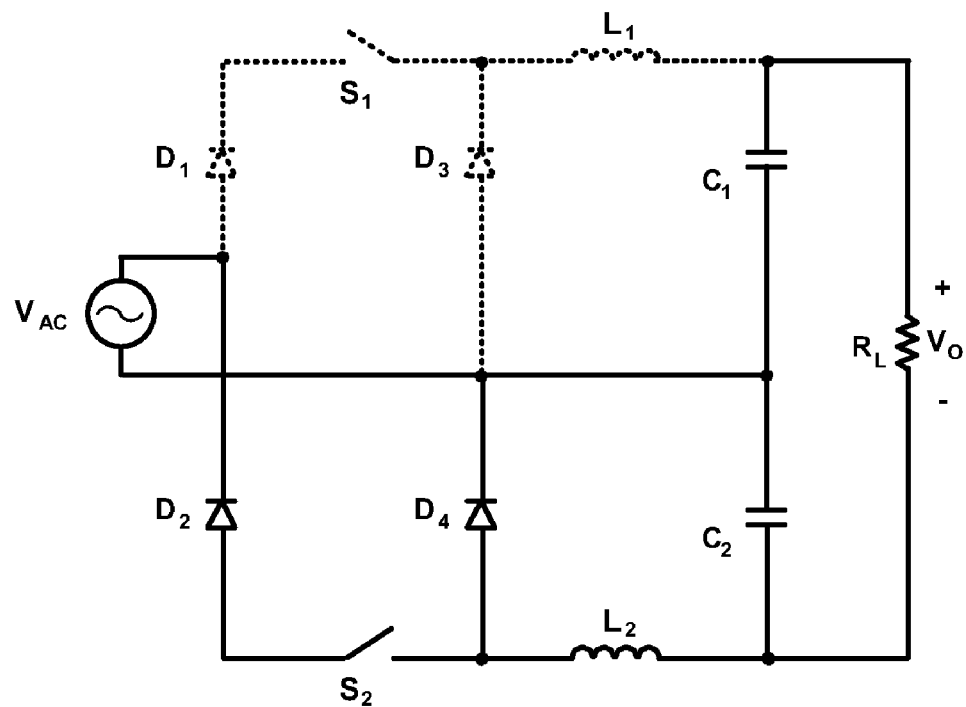

FIGS. 4 and 5 depict the operation of the PFC rectifier of FIG. 3 during the period when the line voltage is positive and negative, respectively. Output voltage $V_O$ of the PFC rectifier is the summation of the voltages across output capacitors $C_1$ and $C_2$. With such a control, output voltage $V_O$ is determined by $$V_O = 2DV_{IN}, \qquad (1)$$

where D is the duty cycle of a pulse-width-modulation and $V_{IN}$ is the rectified ac input voltage $V_{AC}$. The relationship shown in Eq. (1) is valid as long as output voltage $V_O$ is less than twice of input voltage $V_{IN}$. If output voltage $V_O$ is equal to or greater than twice input voltage $V_{IN}$, the converters do not deliver energy from ac input source to the output capacitors. The load current is maintained by the output capacitors during this condition.

Figure 6:
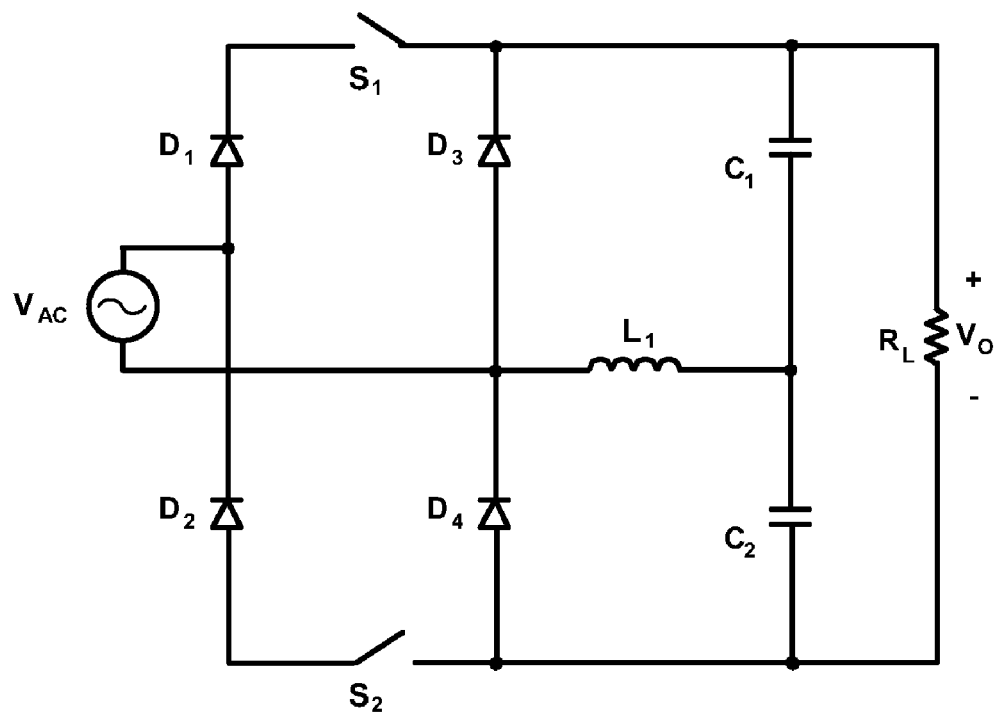
FIG. 6 shows a PFC rectifier according to the present invention having a single inductor.
Figure 7:
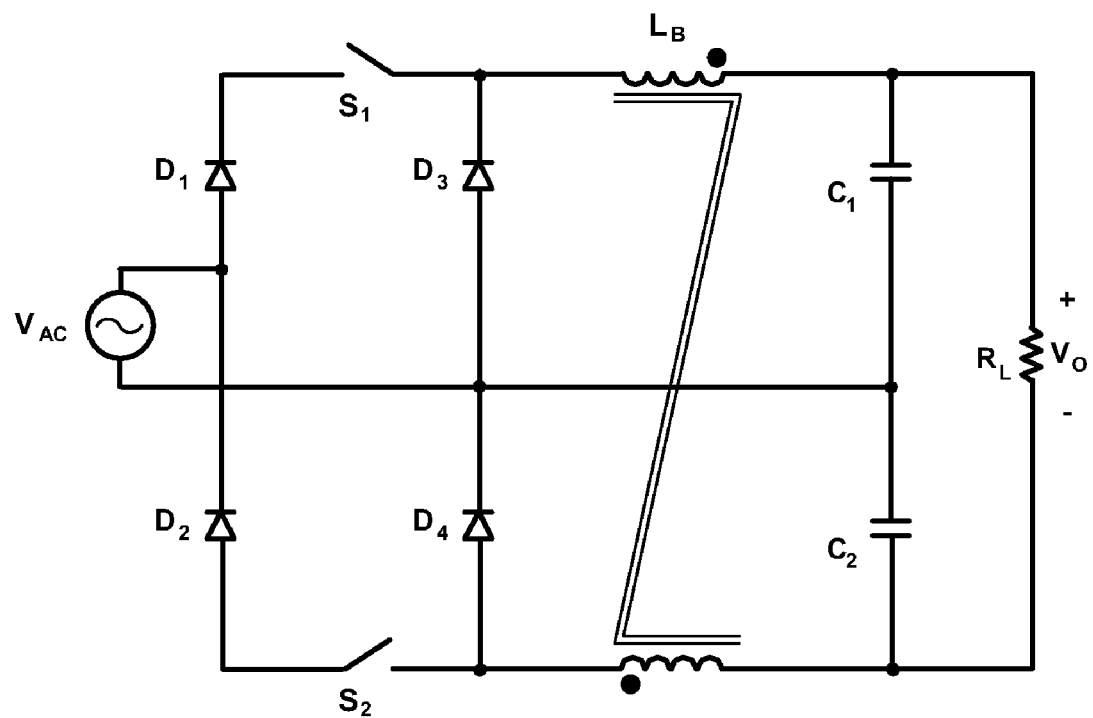
FIG. 7 shows a PFC rectifier according to the present invention having magnetically coupled inductors.

In an alternative embodiment, inductors $L_1$ and $L_2$ in the PFC rectifier in FIG. 3 can be replaced by an inductor if the node between capacitor $C_1$ and capacitor $C_2$ is connected through the inductor to the rest of the circuit as shown in FIG. 6. In another alternative embodiment, inductors $L_1$ and $L_2$ in the rectifier in FIG. 3 can be magnetically coupled as shown in FIG. 7.

Figure 8:
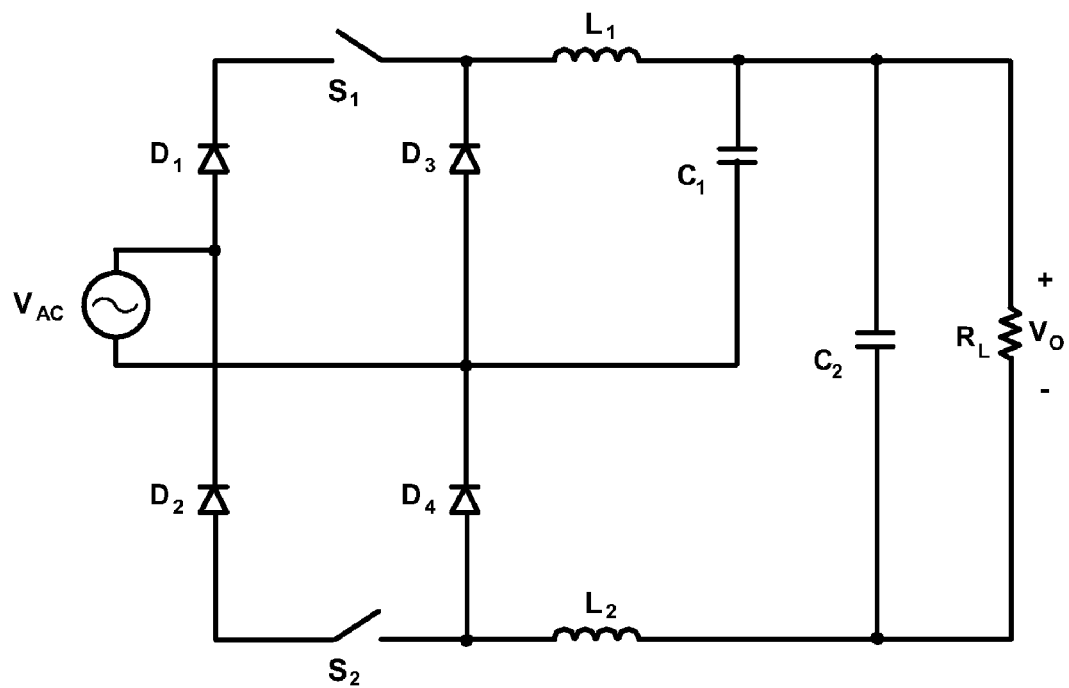
FIG. 8 shows a PFC buck rectifier according to another embodiment of the present invention.
Figure 9:
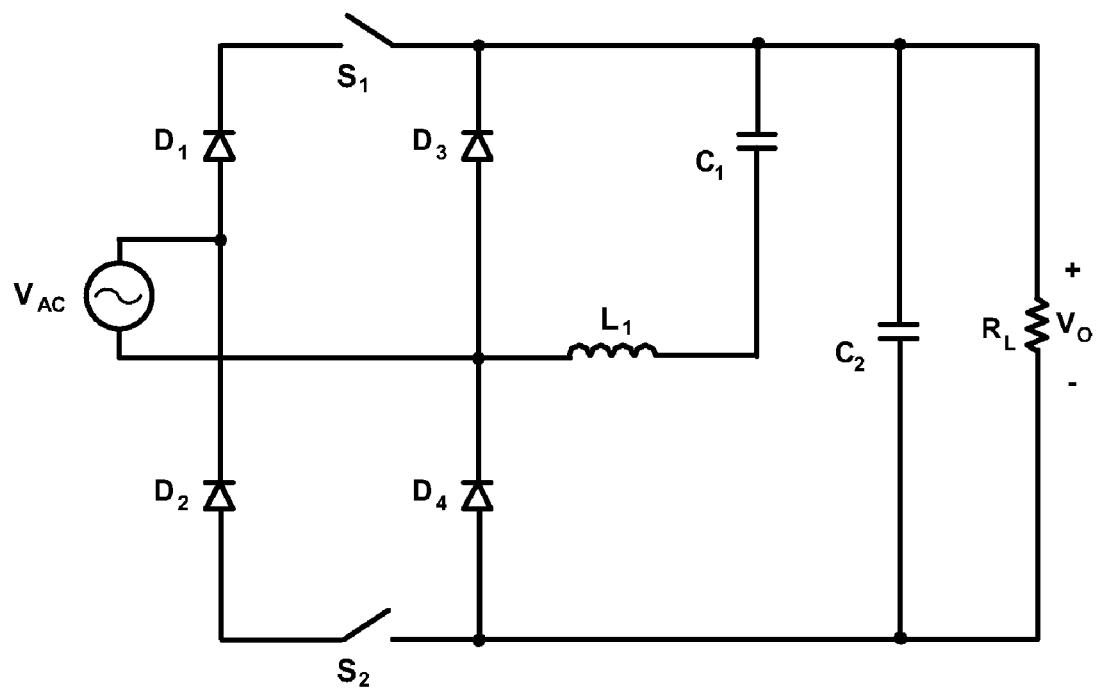
FIG. 9 shows the PFC rectifier of FIG. 8 with a single inductor.

A PFC buck rectifier having another arrangement for the voltage-doubler is shown in FIG. 8, where a terminal of capacitor $C_1$ is connected to the positive rail of the load. The first buck converter delivers energy from ac input source $V_{AC}$ to first output capacitor $C_1$ when ac input source $V_{AC}$ is in a positive half line cycle. When ac input source $V_{AC}$ is in a negative half line cycle, the second buck converter delivers energy from ac input source $V_{AC}$ to output capacitor $C_2$. Because output capacitor $C_2$ is serially connected through capacitor $C_1$, the voltage across capacitor $C_2$ becomes twice the voltage across capacitor $C_1$. In an alternative embodiment, inductors $L_1$ and $L_2$ in the PFC rectifier in FIG. 8 can be replaced by an inductor if the inductor is serially connected to capacitor $C_1$ as shown in FIG. 9.

Figure 10:
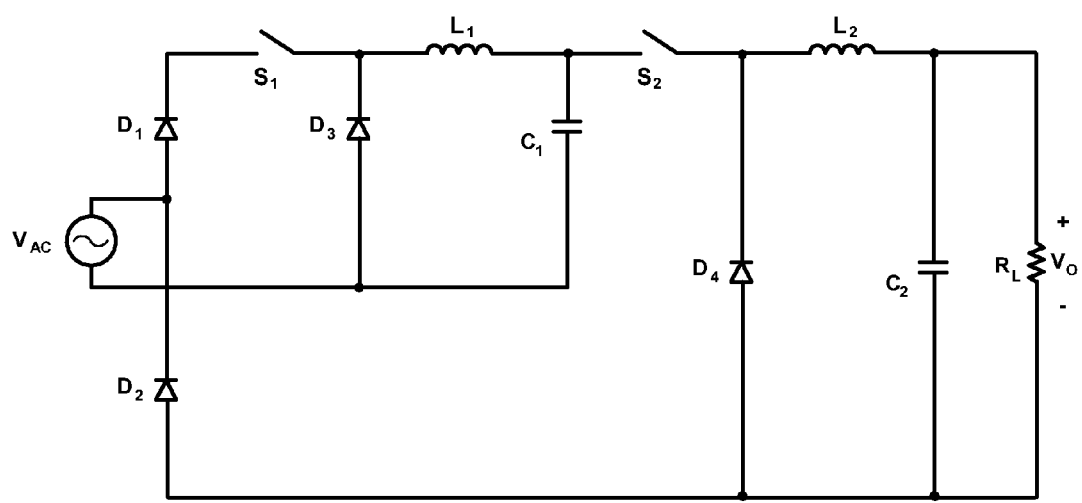
FIG. 10 shows a PFC rectifier according to yet another embodiment of the present invention comprising two serially coupled buck converters.

The inverted buck converter shown in FIG. 8 can be replaced by non-inverter buck converter as shown in FIG. 10. The first buck converter delivers energy from ac input source $V_{AC}$ to first output capacitor $C_1$ when ac input source $V_{AC}$ is in a positive half line cycle. When ac input source $V_{AC}$ is in a negative half line cycle, the second buck converter delivers energy from serially connected ac input source $V_{AC}$ and capacitor $C_1$ to output capacitor $C_2$. A PFC buck rectifier having another type voltage-doubler is shown in FIG. 11 where a terminal of capacitor $C_1$ is connected to the negative rail of the load.

Figure 11:
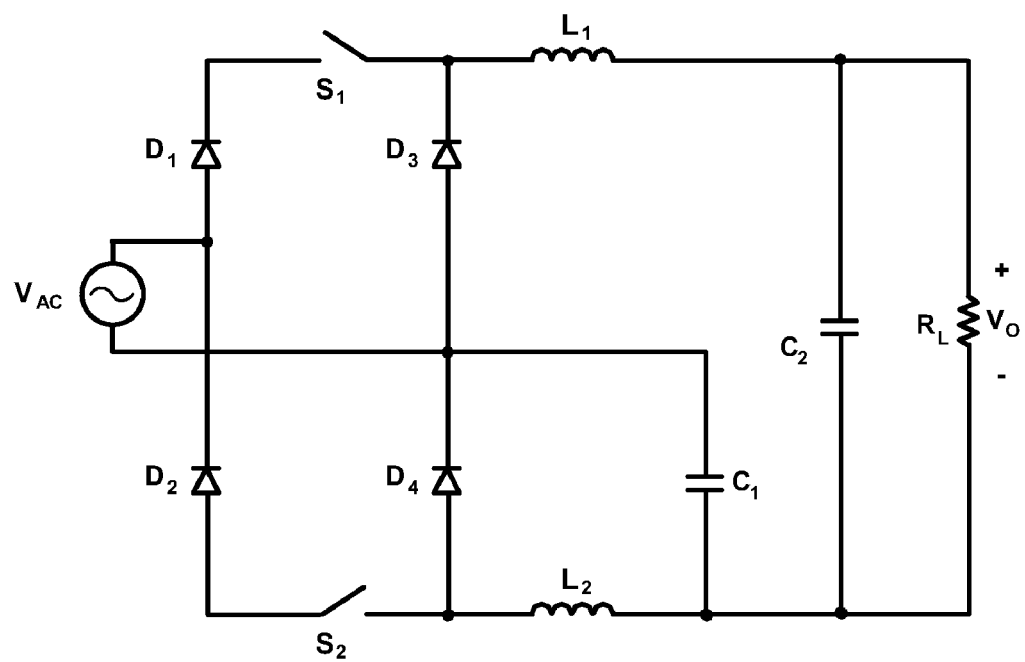
FIG. 11 shows a PFC rectifier having a voltage-doubler according to yet another embodiment of the present invention.
Figure 12:
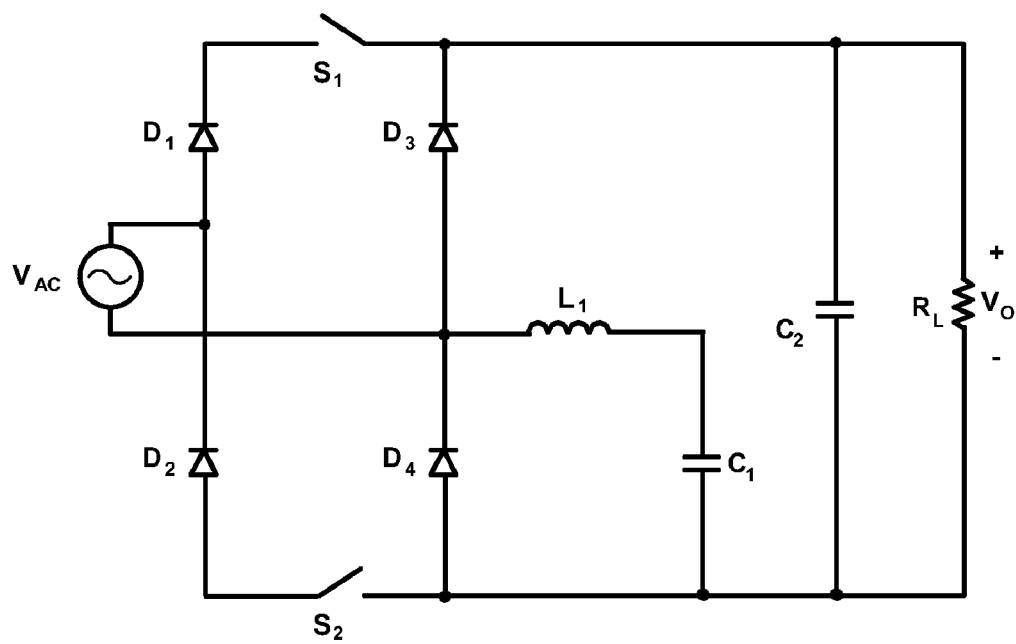
FIG. 12 shows the PFC rectifier of FIG. 11 having a output inductor.
Figure 13:
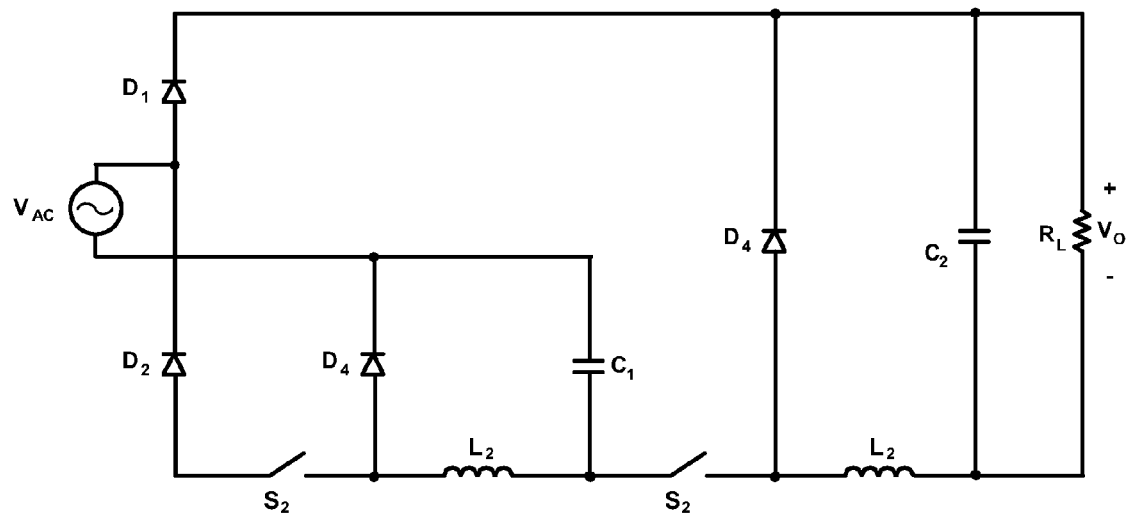
FIG. 13 shows a PFC rectifier comprising two inverted buck converters.

In an alternative embodiment, inductors $L_1$ and $L_2$ in the PFC rectifier in FIG. 11 can be replaced by an inductor if the inductor is serially connected to capacitor $C_1$ as shown in FIG. 12. The non-inverted buck converter shown in FIG. 11 can be replaced by inverted buck converter as shown in FIG. 13.

Figure 14:
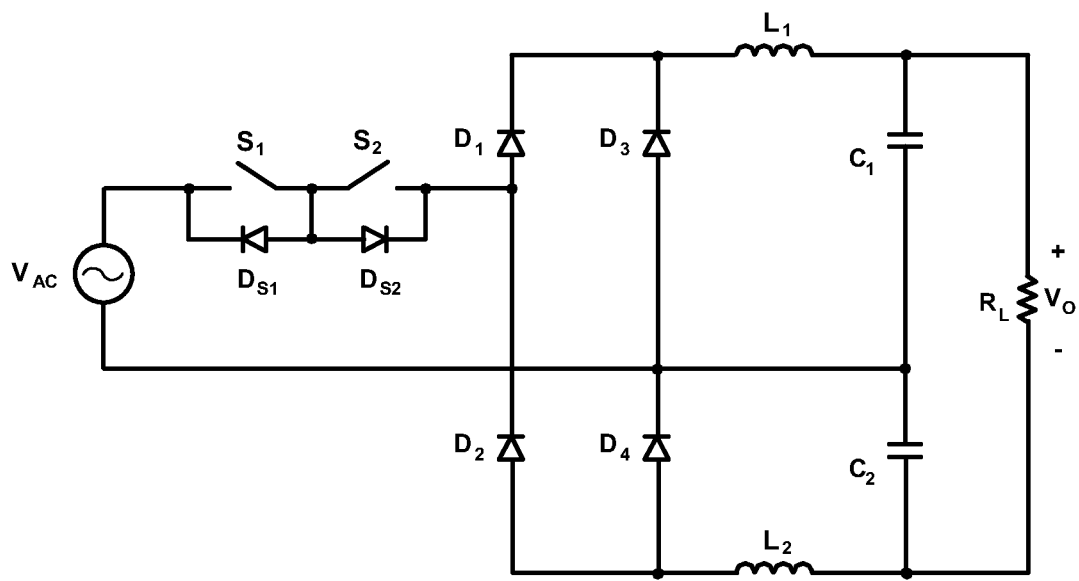
FIG. 14 shows a PFC rectifier comprising a bi-directional switch.

First switch $S_1$ and second switch $S_2$ in the PFC rectifier in FIG. 3 can be located at the ac side of input diodes $D_1$ and $D_2$ as shown in FIG. 14. The serial connection of switches $S_1$ and $S_2$ with their anti-parallel diodes $D_{S1}$ and $D_{S2}$ forms a bi-directional switch. In an alternative embodiment, inductors $L_1$ and $L_2$ in the PFC rectifier in FIG. 14 can be replaced by an inductor if the node between capacitor $C_1$ and capacitor $C_2$ is connected through the inductor to the rest of the circuit as shown in FIG. 15.

Figure 15:
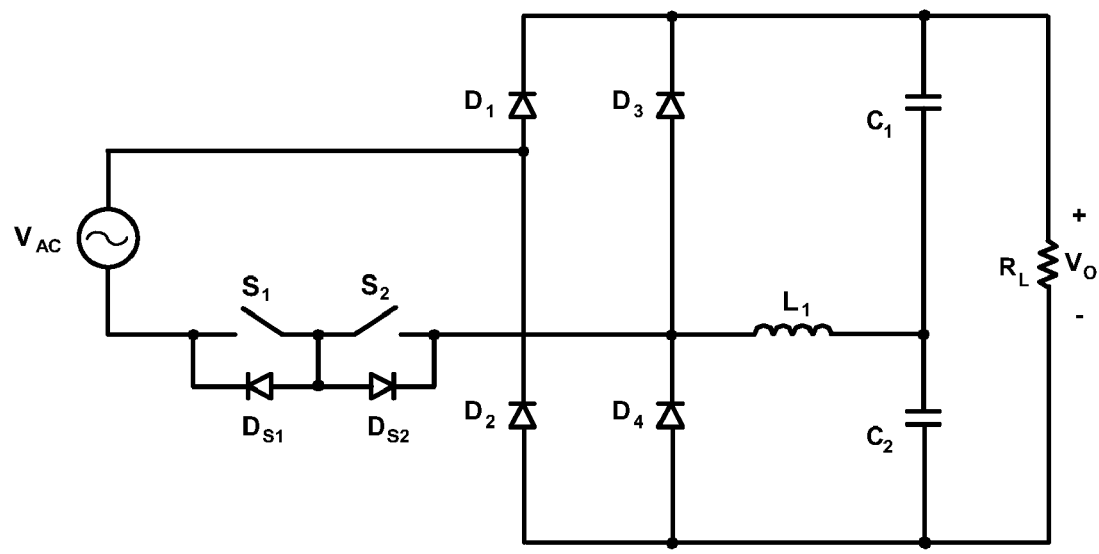
FIG. 15 shows the PFC rectifier of FIG. 14 having a single inductor and a bi-directional switch.
Figure 16:
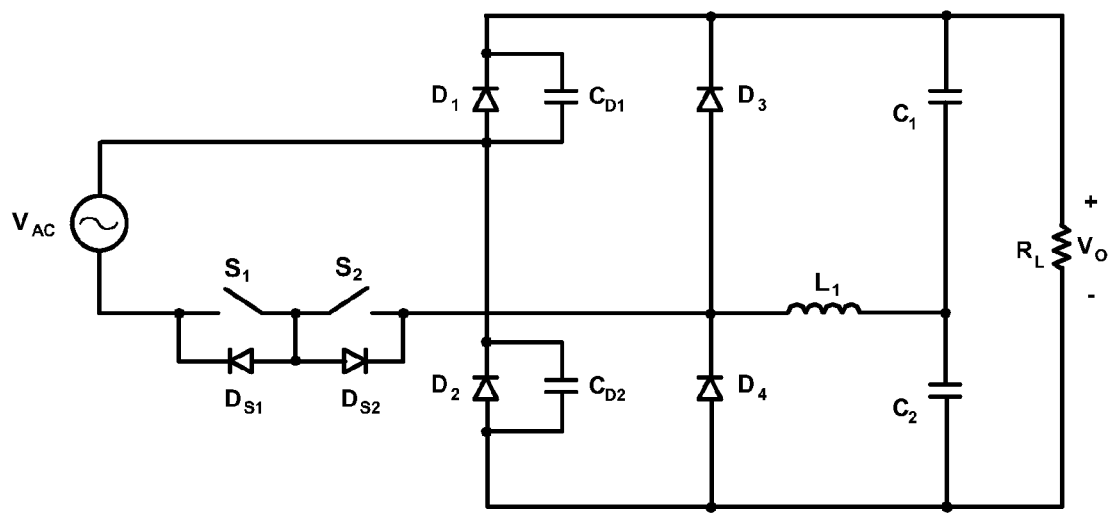
FIG. 16 shows the PFC rectifier of FIG. 15 having snubber capacitors across diodes.

In another alternative embodiment, input diodes $D_1$ and $D_2$ in the rectifier in FIG. 15 are paralleled by snubber capacitors $C_{D1}$ and $C_{D2}$ as shown in FIG. 16. The additional snubber capacitors greatly reduce common-mode noises.

Figure 17:
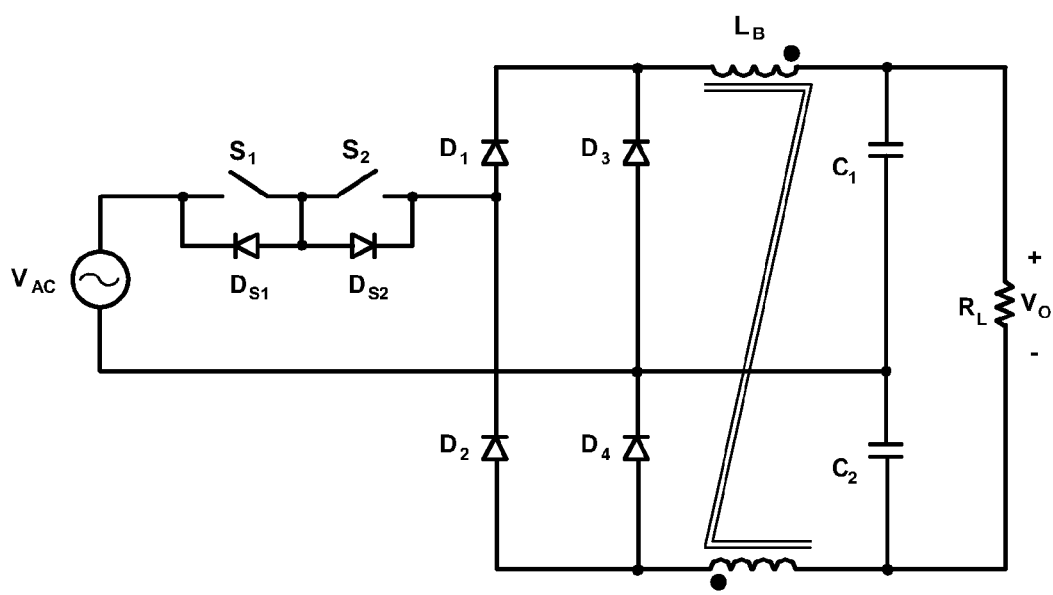
FIG. 17 shows the PFC rectifier of FIG. 14 having magnetically coupled inductors.

In another alternative embodiment, inductors $L_1$ and $L_2$ in the rectifier in FIG. 14 can be magnetically coupled as shown in FIG. 17.

Figure 18:
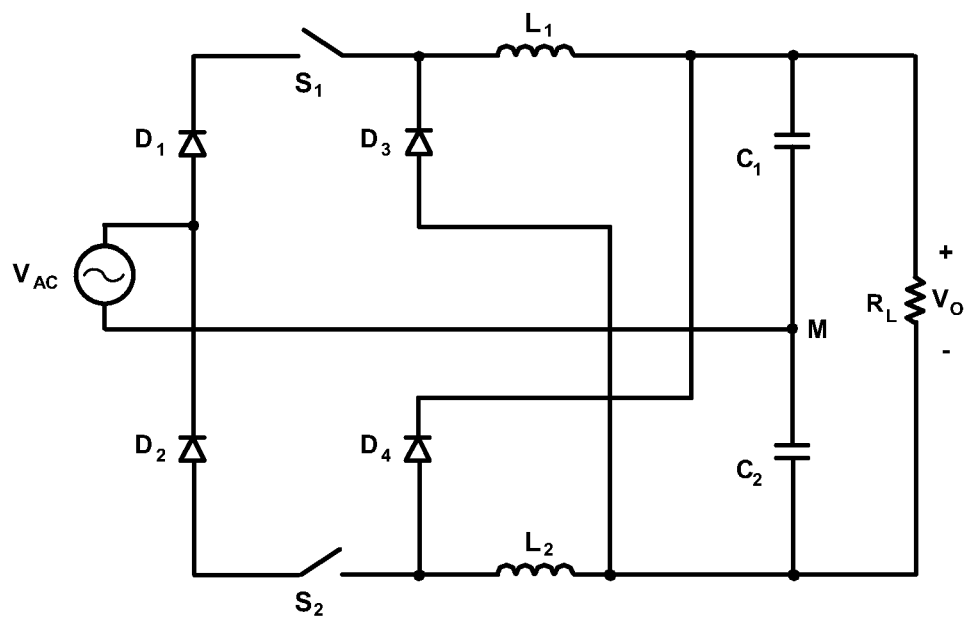
FIG. 18 shows a PFC rectifier with a nonlinear-voltage-gain.
Figure 19:
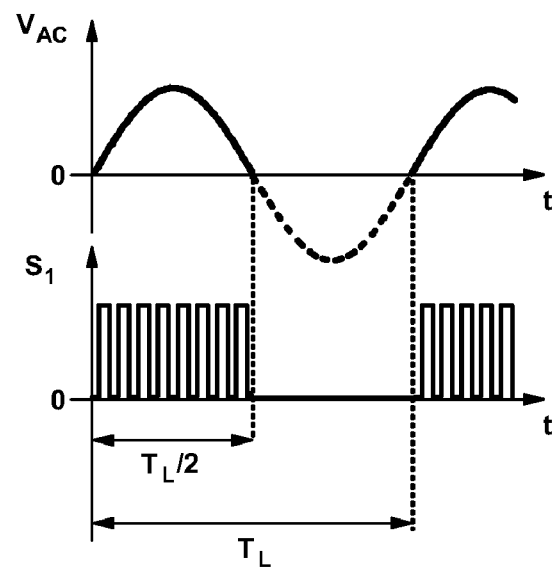
FIG. 19 depicts the operation of the PFC rectifier of FIG. 18 during the period when the line voltage is positive.
Figure 19:
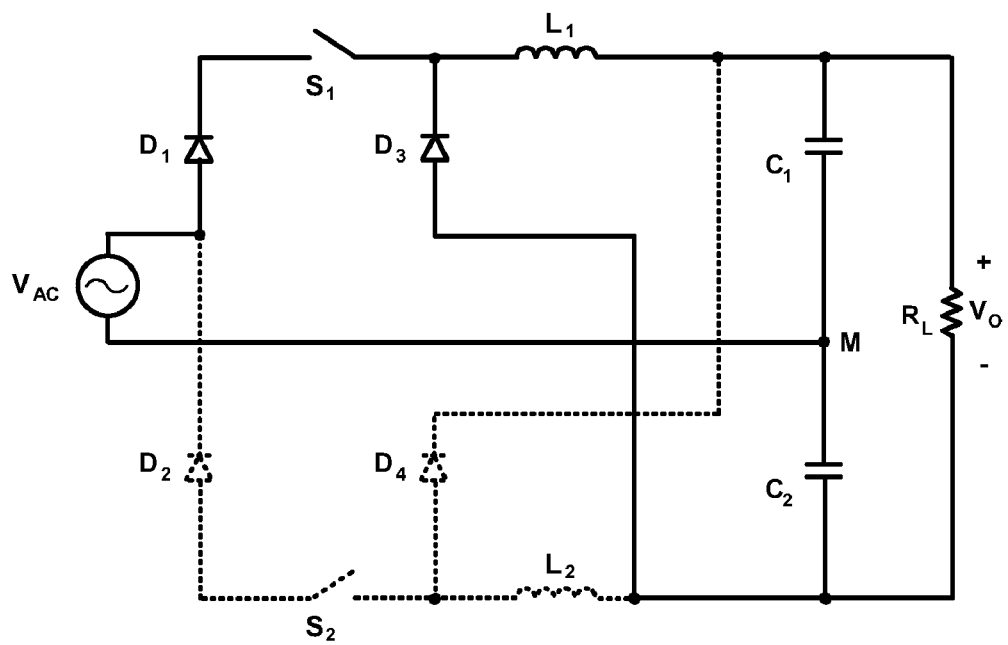
Figure 20:
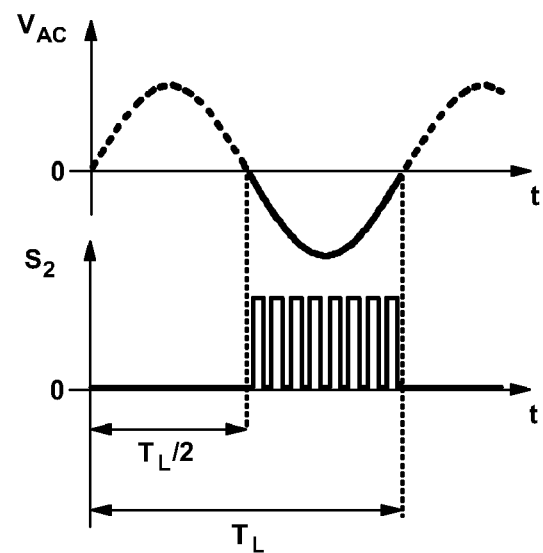
FIG. 20 depicts the operation of the PFC rectifier of FIG. 18 during the period when the line voltage is negative.
Figure 20:
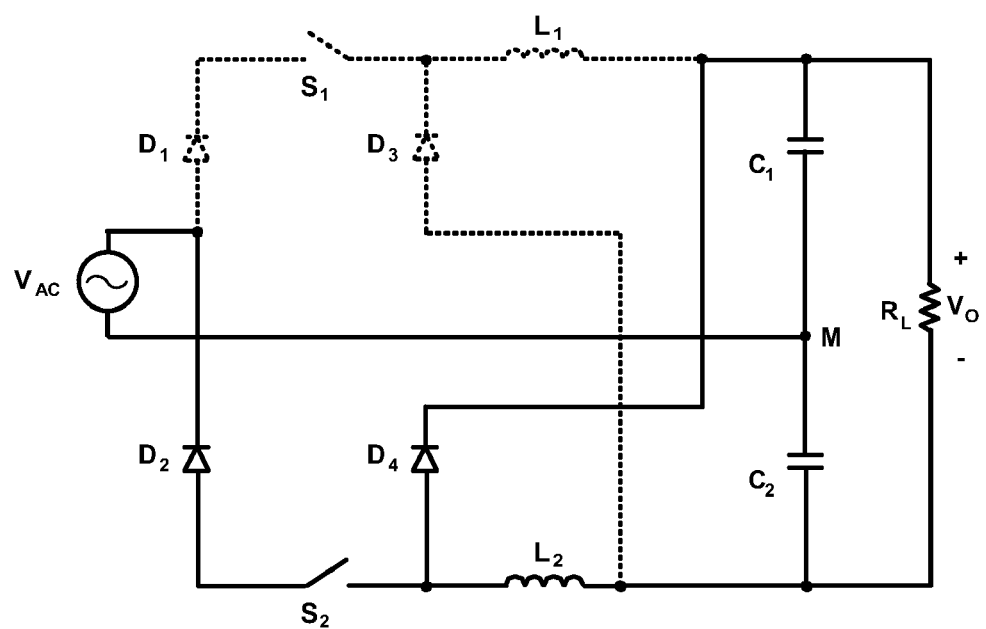

In another alternative embodiment, a PFC buck rectifier shown in FIG. 18 has a nonlinear input-to-output voltage gain. The structure of the proposed topology is similar to that of the said linear input-to-output voltage gain topology in FIG. 3 except that the anode of first freewheeling diode $D_3$ is connected to the node between second inductor $L_2$ and second series capacitor $C_2$ while the cathode of second freewheeling diode $D_4$ is connected to the node between first inductor $L_1$ and first series capacitor $C_1$. FIGS. 19 and 20 highlight the operation of the PFC rectifier of FIG. 18 during the period when the line voltage is positive and negative, respectively. Output voltage $V_O$ of the PFC rectifier is the summation of the voltages across output capacitors $C_1$ and $C_2$. With such a control, output voltage $V_O$ is determined by $$V_O = \frac{2D}{1+(1-D)^2} V_{IN}. \qquad (2)$$

As shown in Eq. (2), if duty cycle D is near 1, i.e., input voltage VIN is very close to half of output voltage VO, the input-to-output gain is similar to that shown in Eq. (1). However, if duty cycle D is near zero, i.e., input voltage VIN is much greater than output voltage VO, the input-to-output gain becomes $$V_O = DV_{IN}, \qquad (3)$$

which is similar to the input-to-output gain of a conventional buck converter.

Figure 21:
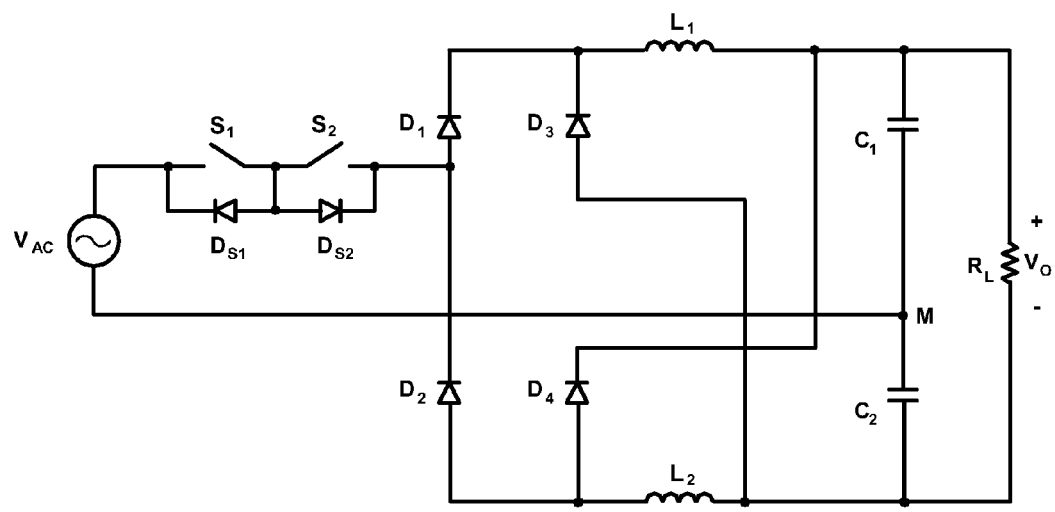
FIG. 21 shows a PFC rectifier with nonlinear-voltage-gain having a bi-directional switch.

In another alternative embodiment, inductors $L_1$ and $L_2$ in the rectifier in FIG. 18 can be magnetically coupled. Moreover, first switch $S_1$ and second switch $S_2$ in the PFC rectifier in FIG. 18 can be located at the ac side of input diodes $D_1$ and $D_2$ as shown in FIG. 21. The serial connection of switches $S_1$ and $S_2$ with their anti-parallel diodes $D_{S1}$ and $D_{S2}$ forms a bi-directional switch.

Figure 22:
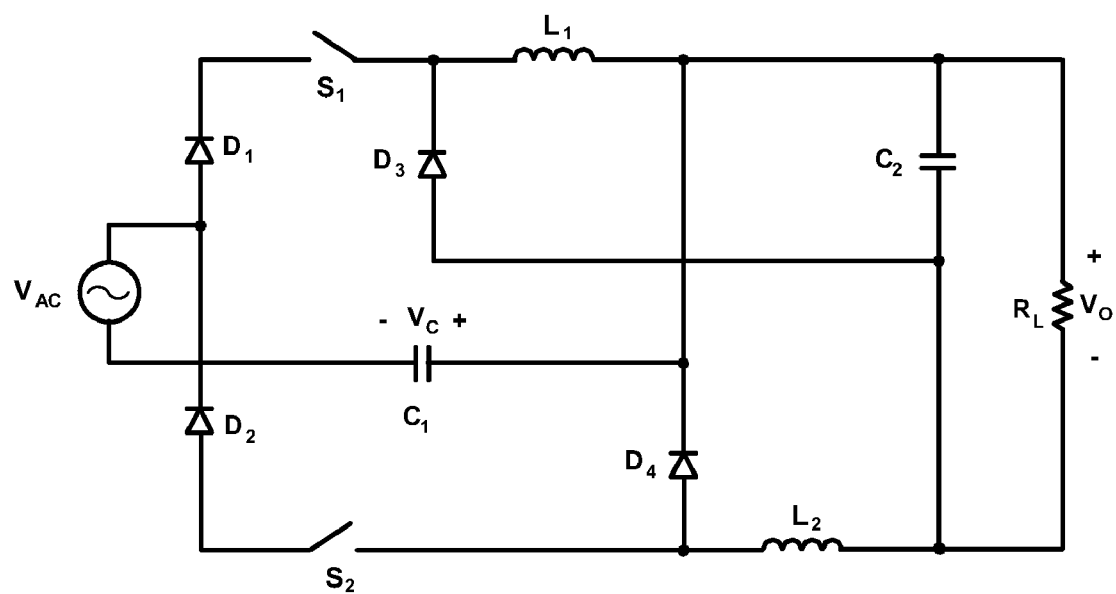
FIG. 22 shows a PFC rectifier with nonlinear-voltage-gain.
Figure 23:
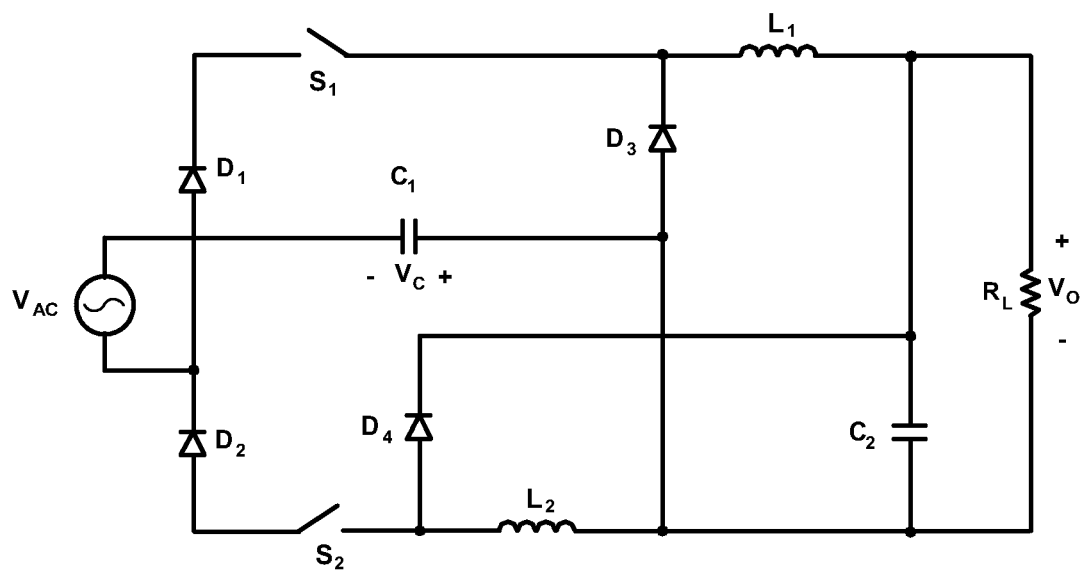
FIG. 23 shows yet another PFC rectifier with nonlinear-voltage-gain rectifier.

Nonlinear gain Bridgeless PFC buck rectifiers having other voltage-doubler structures of the present invention are shown in FIGS. 22 and 23.

Figure 24:
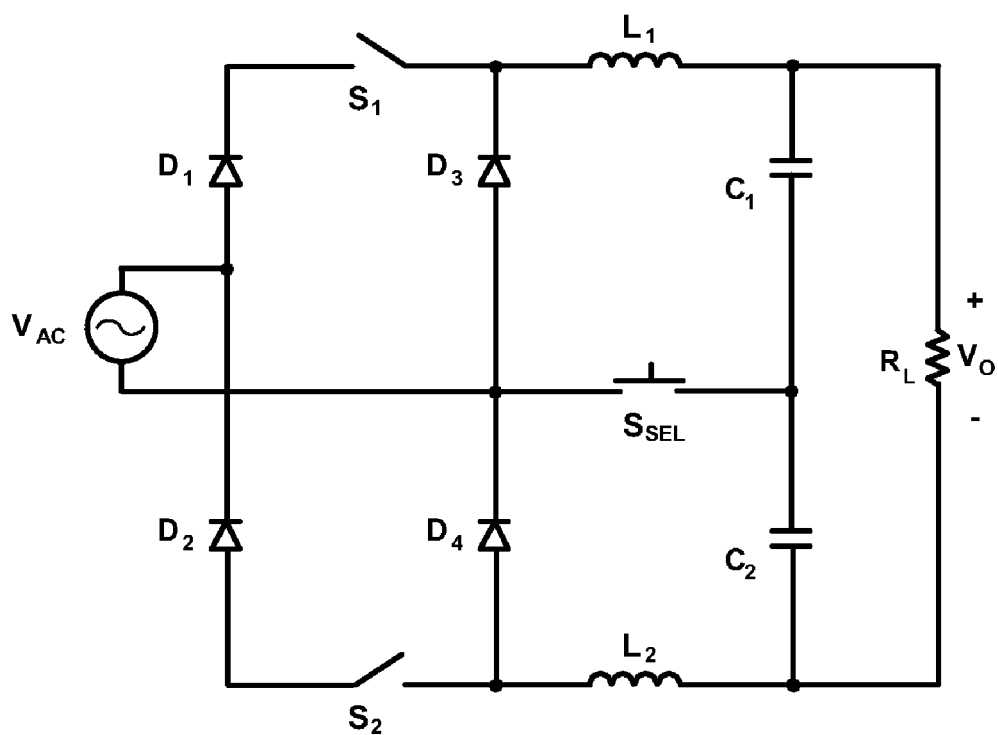
FIG. 24 shows a PFC rectifier having a selection switch.
Figure 25:
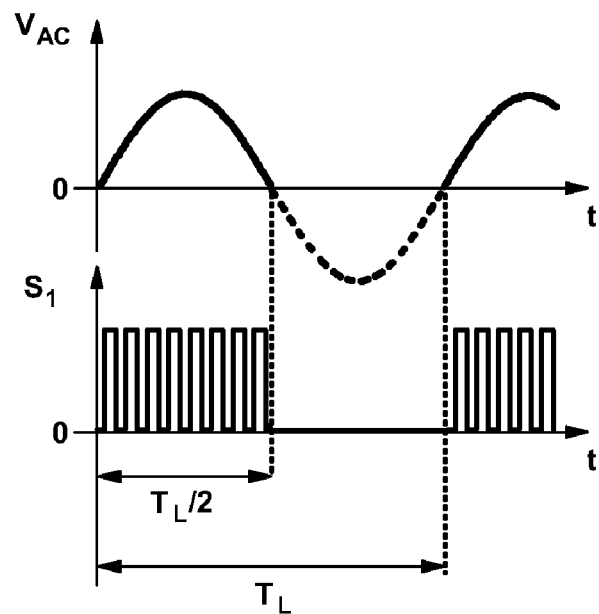
FIG. 25 depicts the operation of the PFC rectifier of FIG. 24 during the period when the line voltage is positive and the selection switch is off.
Figure 25:
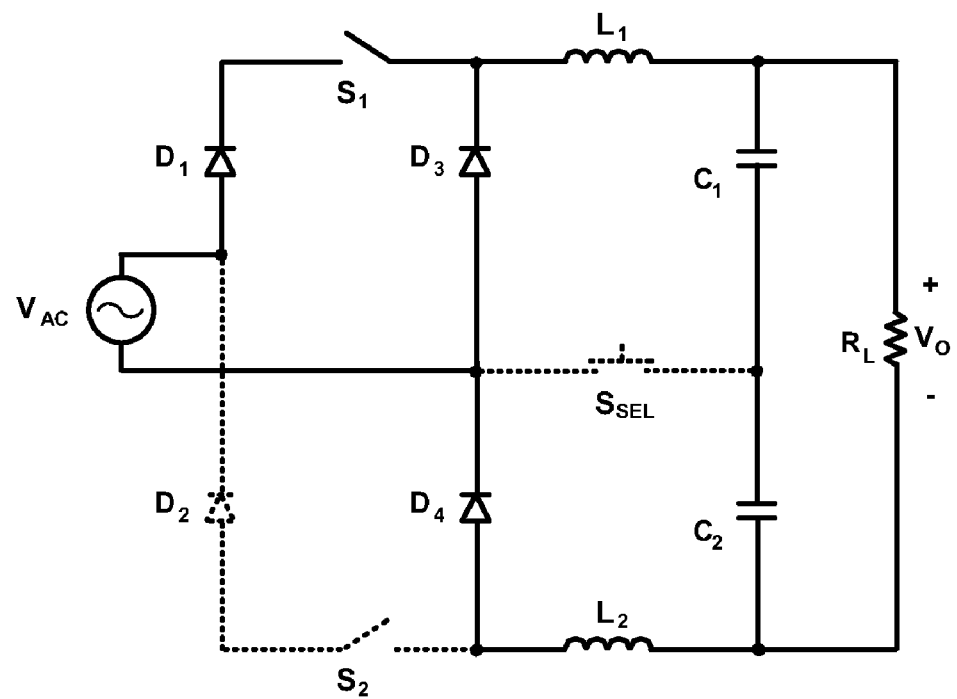
Figure 26:
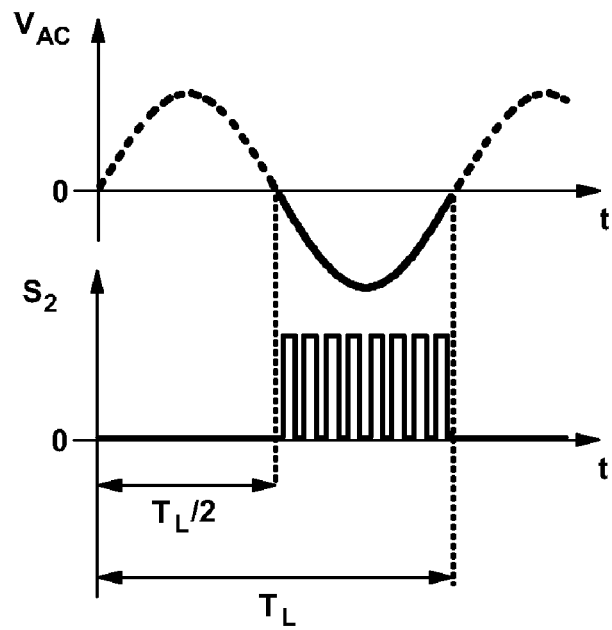
FIG. 26 depicts the operation of the PFC rectifier of FIG. 24 during the period when the line voltage is negative and the selection switch is off.
Figure 26:
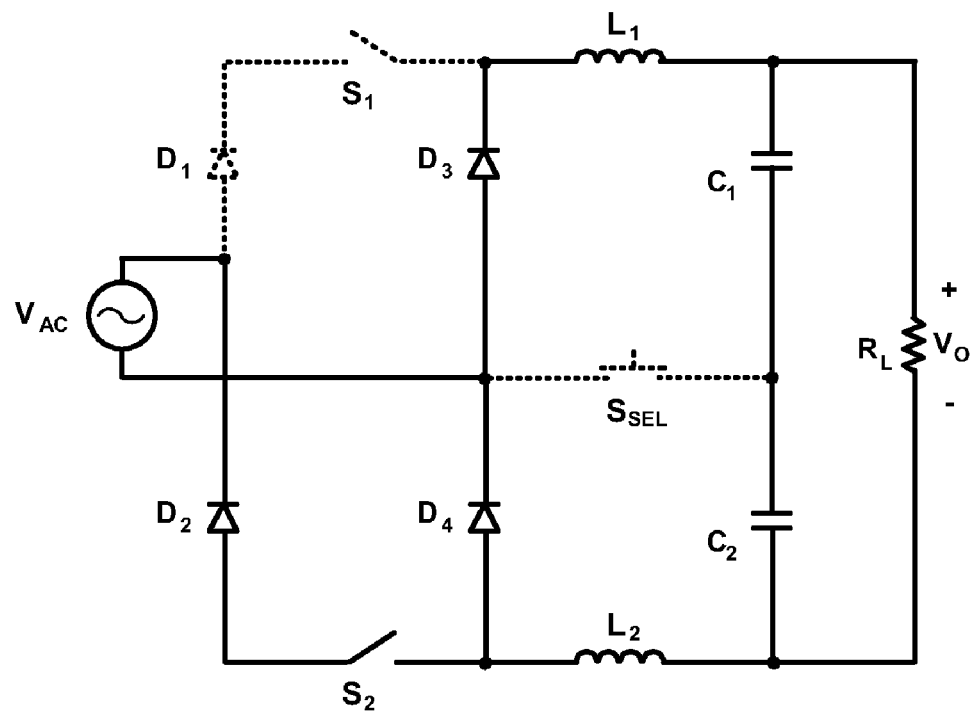

Nonlinear input-to-output voltage gain can be obtained by adding a selection switch. As shown in FIG. 24, selection switch $S_{SEL}$ provides a current path from the node between capacitors $C_1$ and $C_2$ to the node between diodes $D_3$ and $D_4$. If the two nodes are shorted by selection switch $S_{SEL}$, the circuit and its operation are identical to those of the PFC buck rectifier shown in FIG. 3. Output voltage $V_O$ is determined by Eq. (1). By turning off selection switch $S_{SEL}$, the input-to-output gain of the rectifier becomes identical to that shown in Eq. (3). FIGS. 25 and 26 highlight the operation of the PFC rectifier of FIG. 24 during the period when the line voltage is positive and negative, respectively. It should be noted that selection switch $S_{SEL}$ is off during the operations shown in FIGS. 25 and 26.

Figure 27:
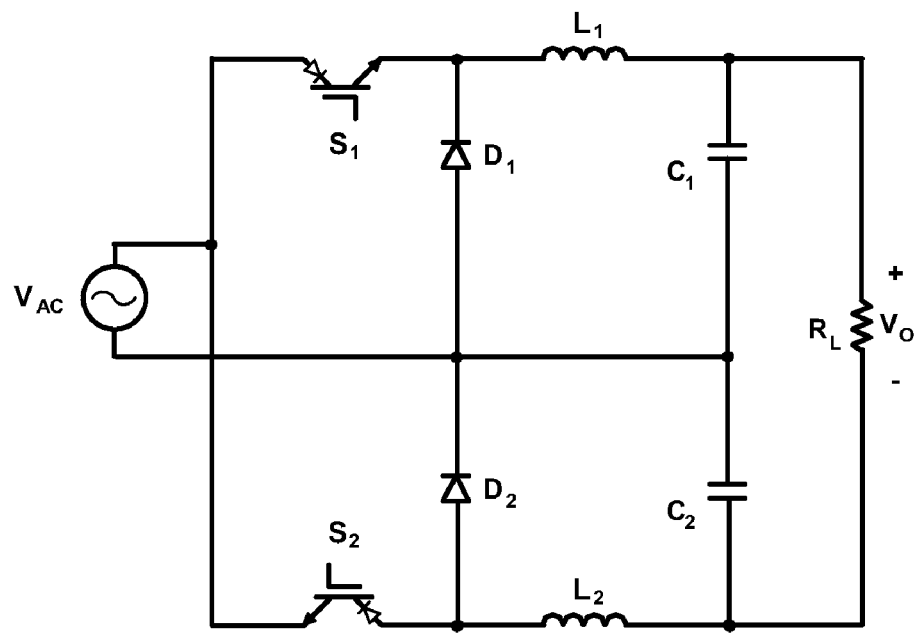
FIG. 27 shows a PFC rectifier having reverse voltage blocking switches.
Figure 28:
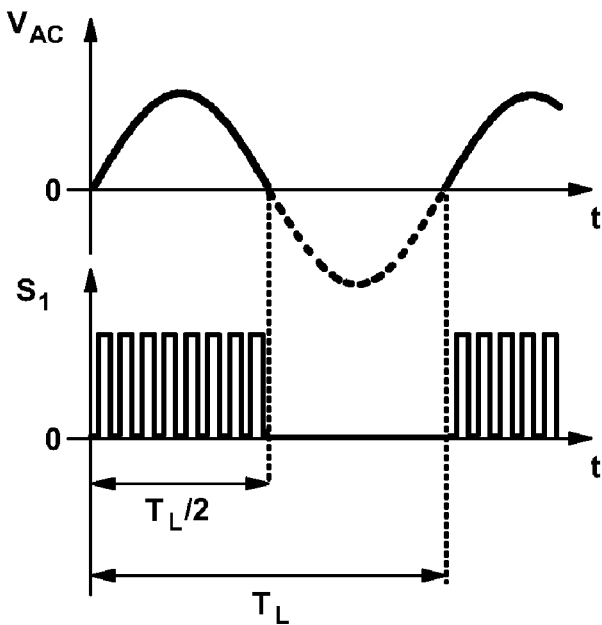
FIG. 28 depicts the operation of the PFC rectifier of FIG. 27 during the period when the line voltage is positive.
Figure 28:
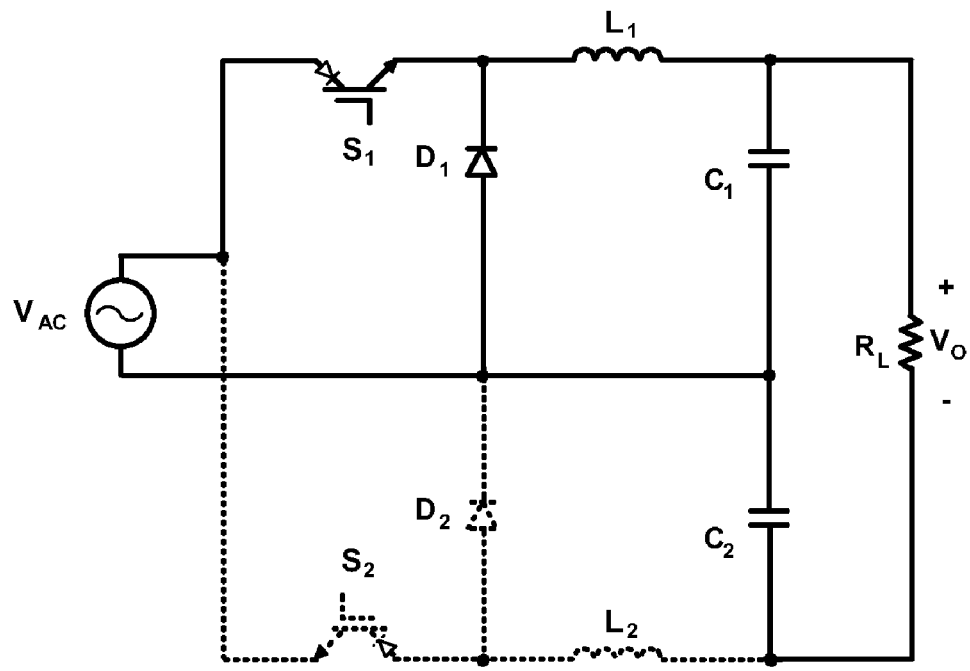
Figure 29:
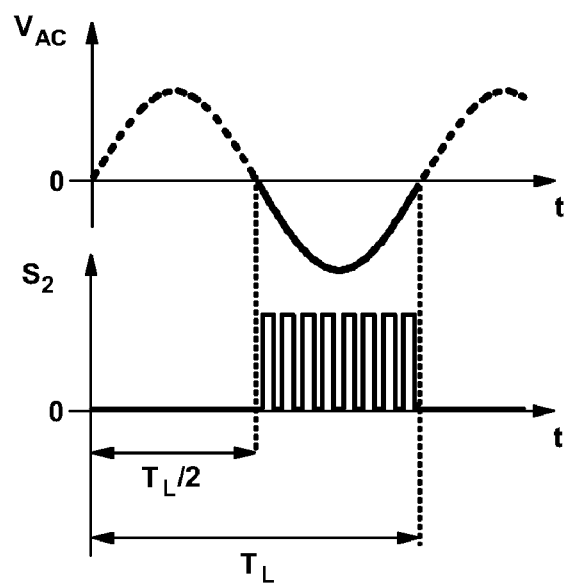
FIG. 29 depicts the operation of the PFC rectifier of FIG. 27 during the period when the line voltage is negative.
Figure 29:
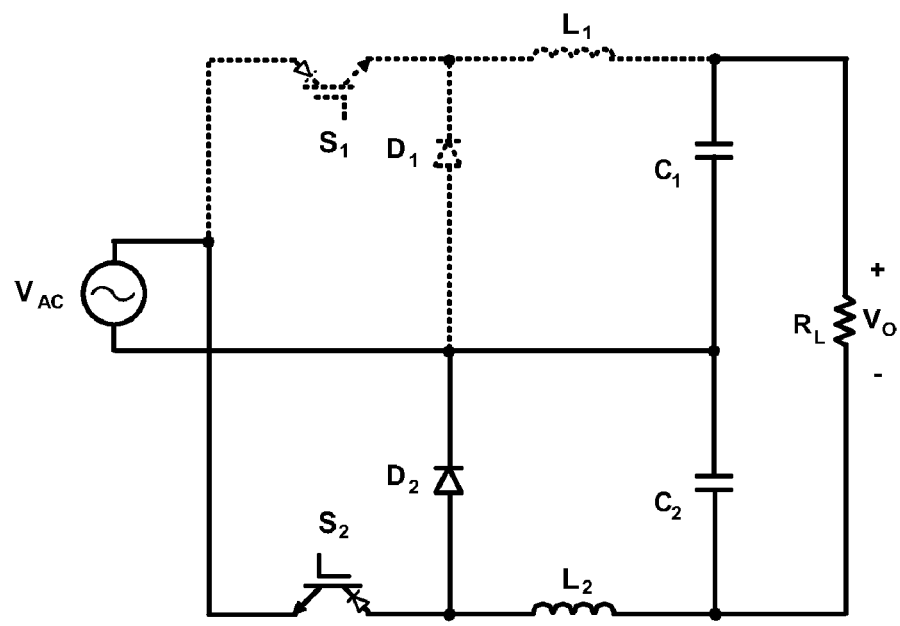

Recently, switch devices that block high voltage reverse voltage have been introduced. The device operates the same way as a switch and a diode connected in series. As a result, the proposed circuit shown in FIG. 3 becomes simplified as shown in FIG. 27 by using reverse voltage blocking switch devices. FIGS. 28 and 29 highlight the operation of the PFC rectifier of FIG. 27 during the period when the line voltage is positive and negative, respectively.

Figure 30:
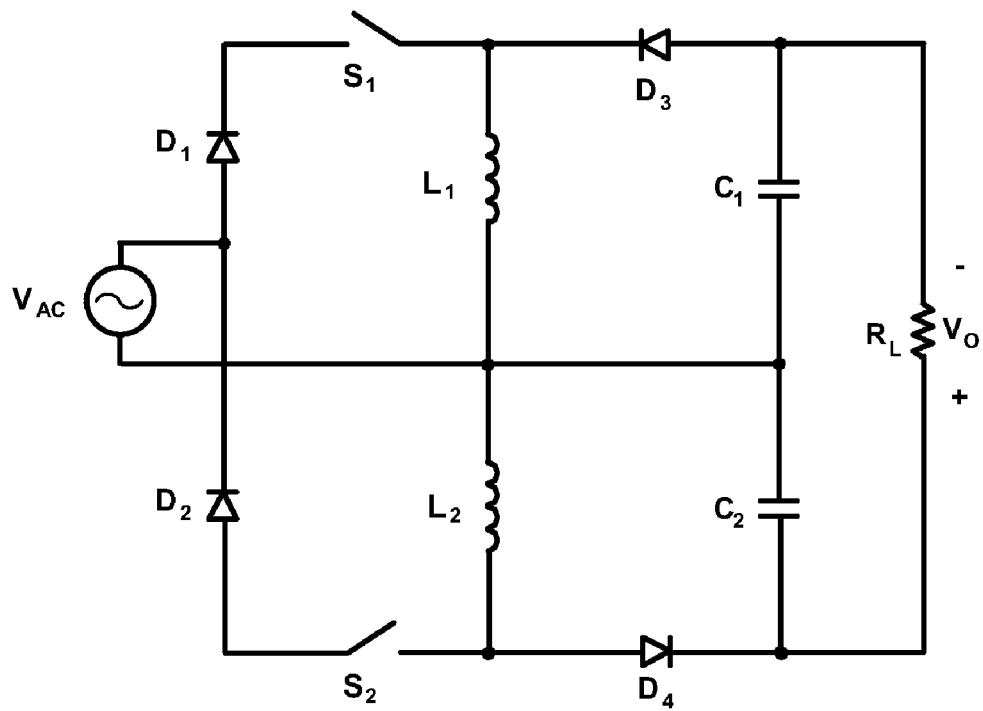
FIG. 30 shows a PFC rectifier having buck-boost converters.

A buck-boost converter topology can be utilized instead of a buck converter topology in the proposed circuit shown in FIG. 3. FIG. 30 shows a bridgeless PFC buck-boost voltage-doubler rectifier of the present invention. It should be noted that the polarity of the output voltage is inverted.

Figure 31:
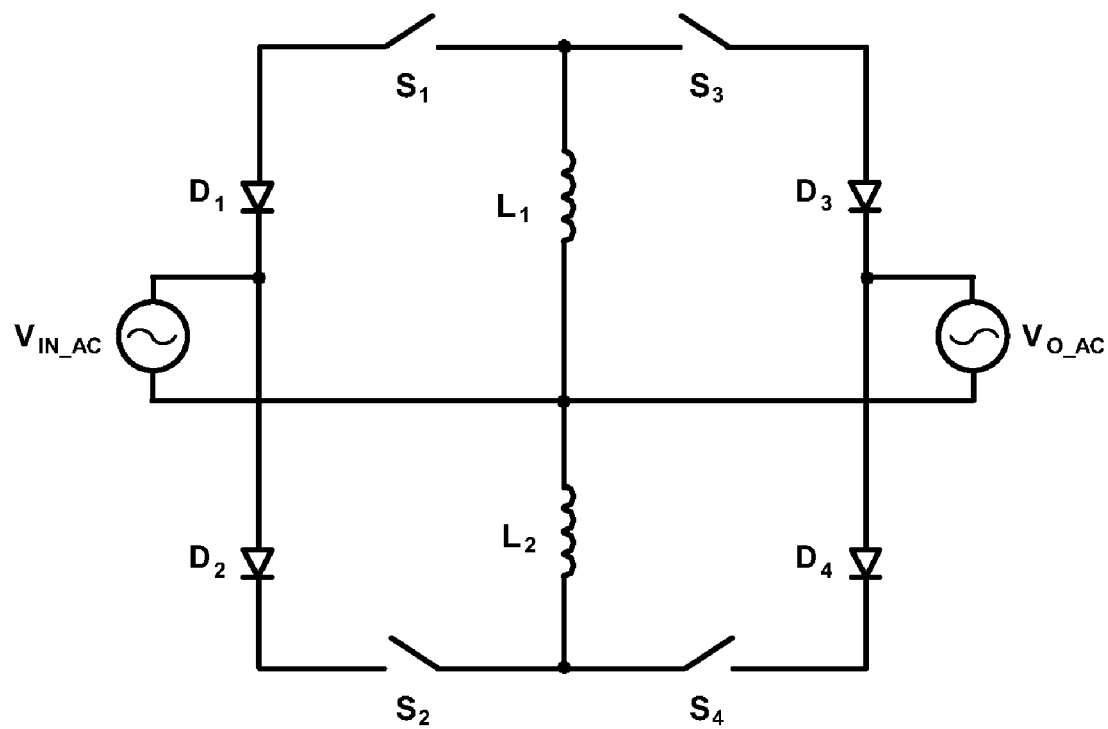
FIG. 31 shows a PFC rectifier formed as a bi-directional ac-ac inverter.
Figure 32:
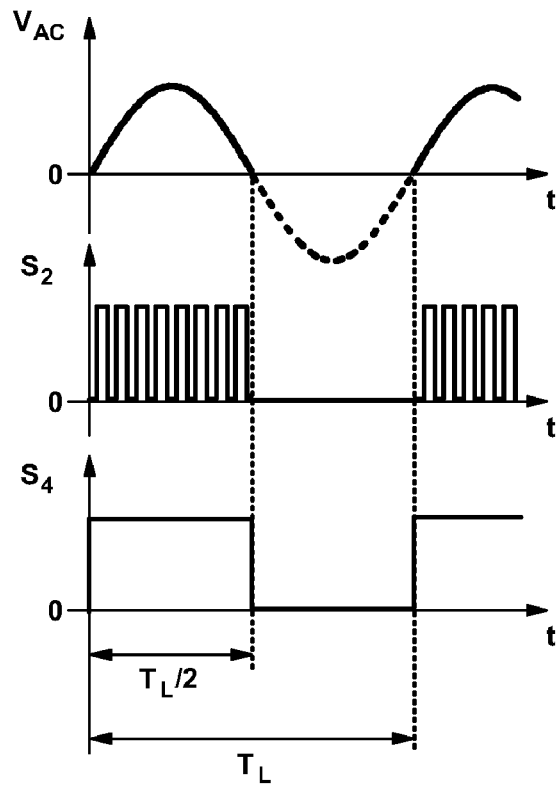
FIG. 32 depicts the operation of the bi-directional ac-ac inverter of FIG. 31 during the period when the line voltage is positive.
Figure 32:
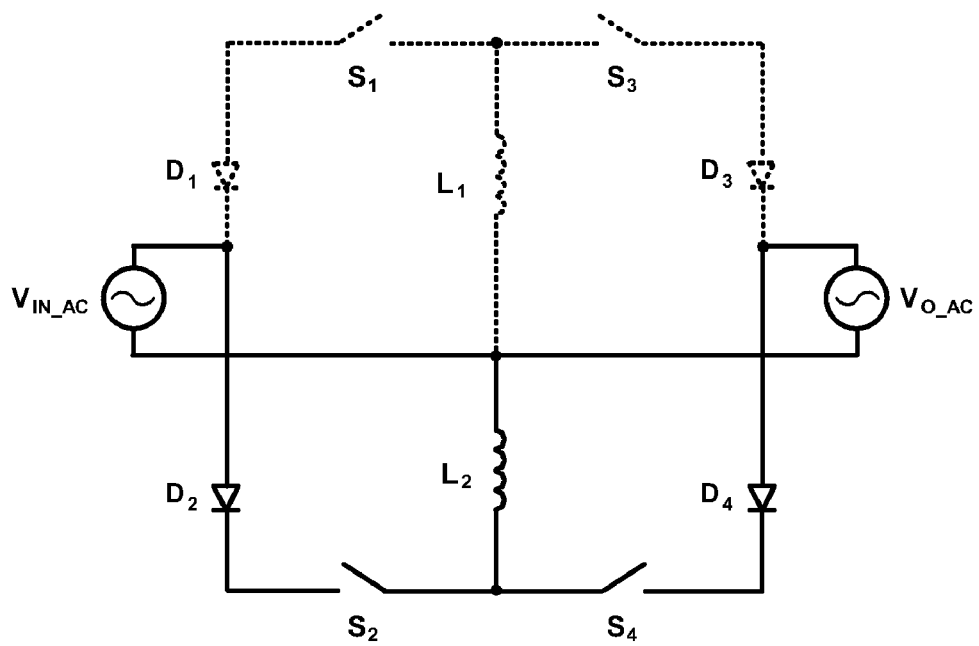
Figure 33:
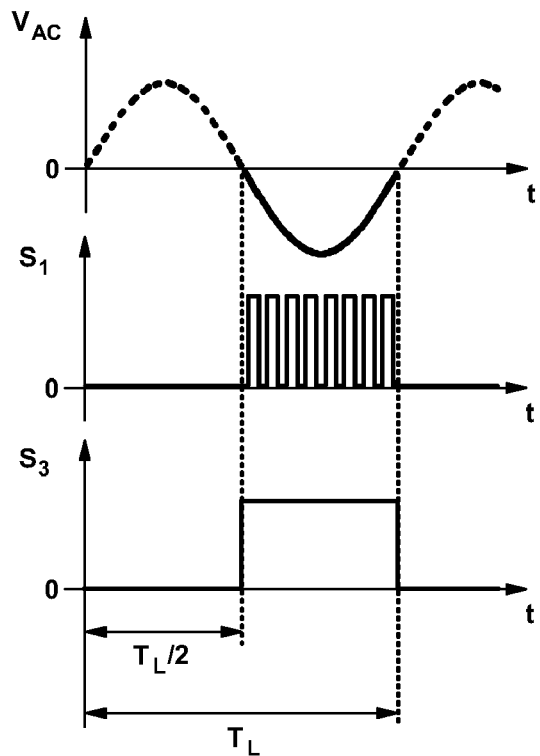
FIG. 33 depicts the operation of the bi-directional ac-ac inverter of FIG. 31 during the period when the line voltage is negative.
Figure 33:
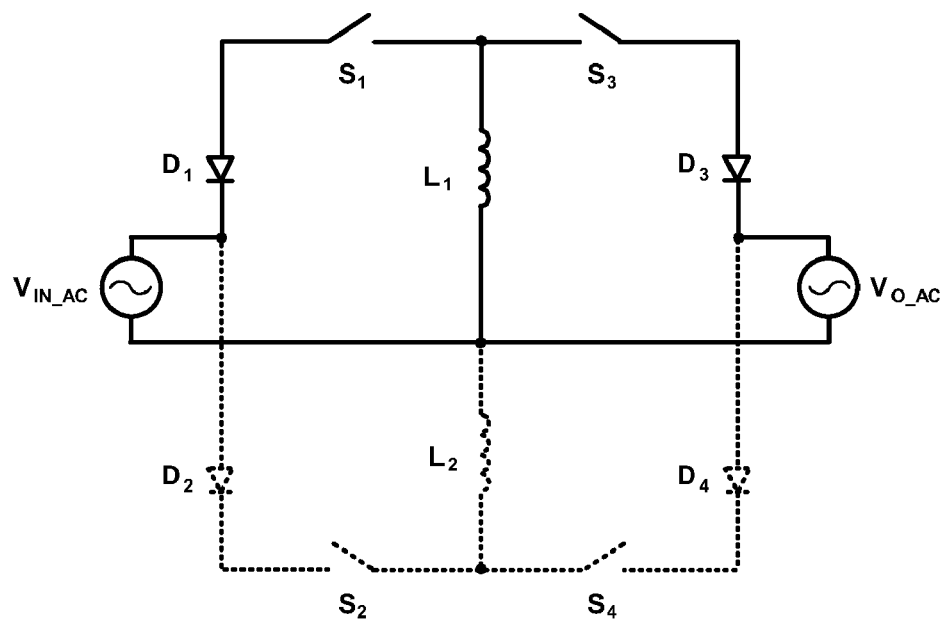

FIG. 31 shows a bi-directional ac-ac inverter of the present invention. The output voltage waveform is inverse proportional to the input voltage. Since the output and input of the circuit are symmetric, the circuit allows a bi-directional power delivery. FIGS. 32 and 33 highlight the operation of the bi-directional ac-ac inverter of FIG. 31 during the period when the line voltage is positive and negative, respectively.

The output voltage of the proposed bridgeless PFC buck voltage-doubler rectifier is regulated by periodic turn-on and -off of the switches. The turn-on time interval is determined by an output voltage feedback circuit. The output voltage feedback circuit consists of four blocks of sub-circuits that include an output voltage sensor and divider block, a compensator block, a pulse-width-modulator (PWM) block, and a driver block as shown in FIG. 34.

Figure 34:
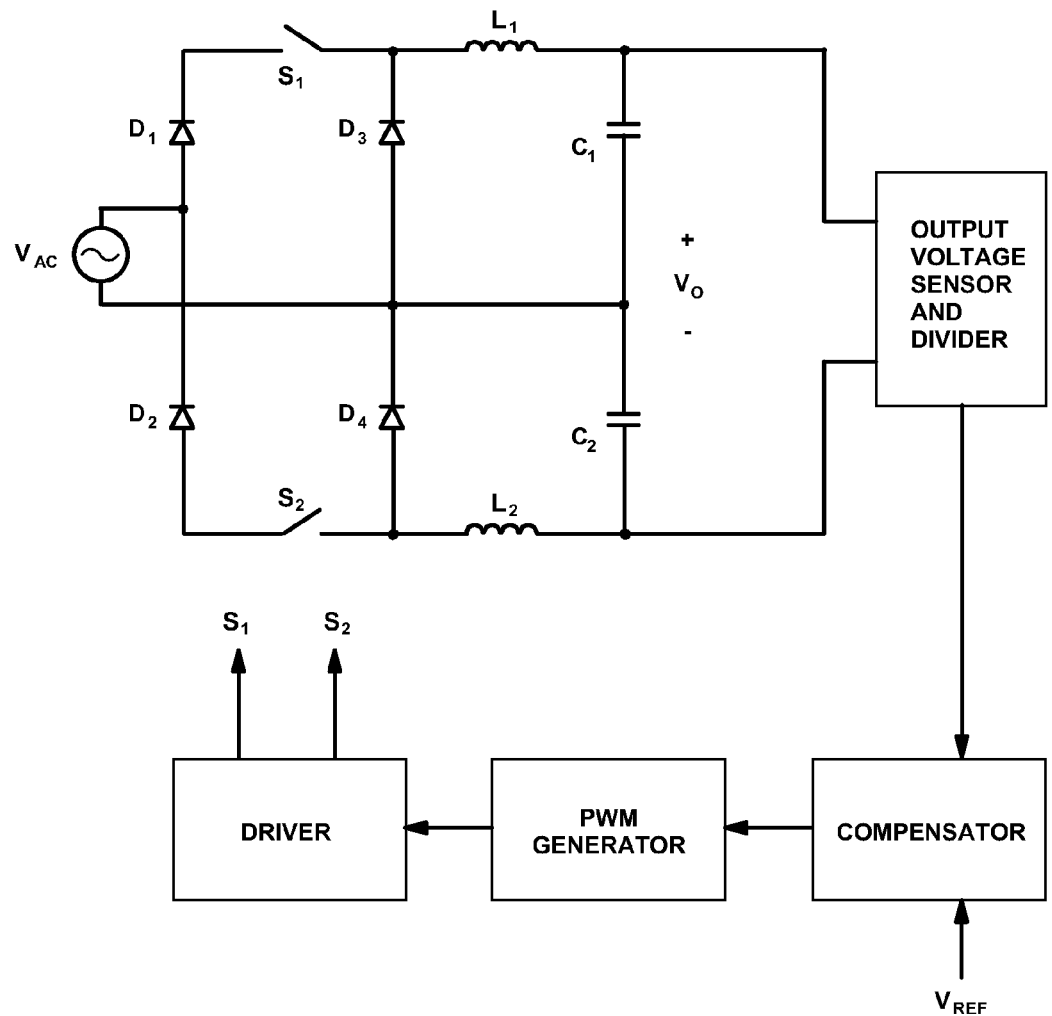
FIG. 34 shows a PFC rectifier having a feedback controller that regulates the output voltage.
Figure 35:
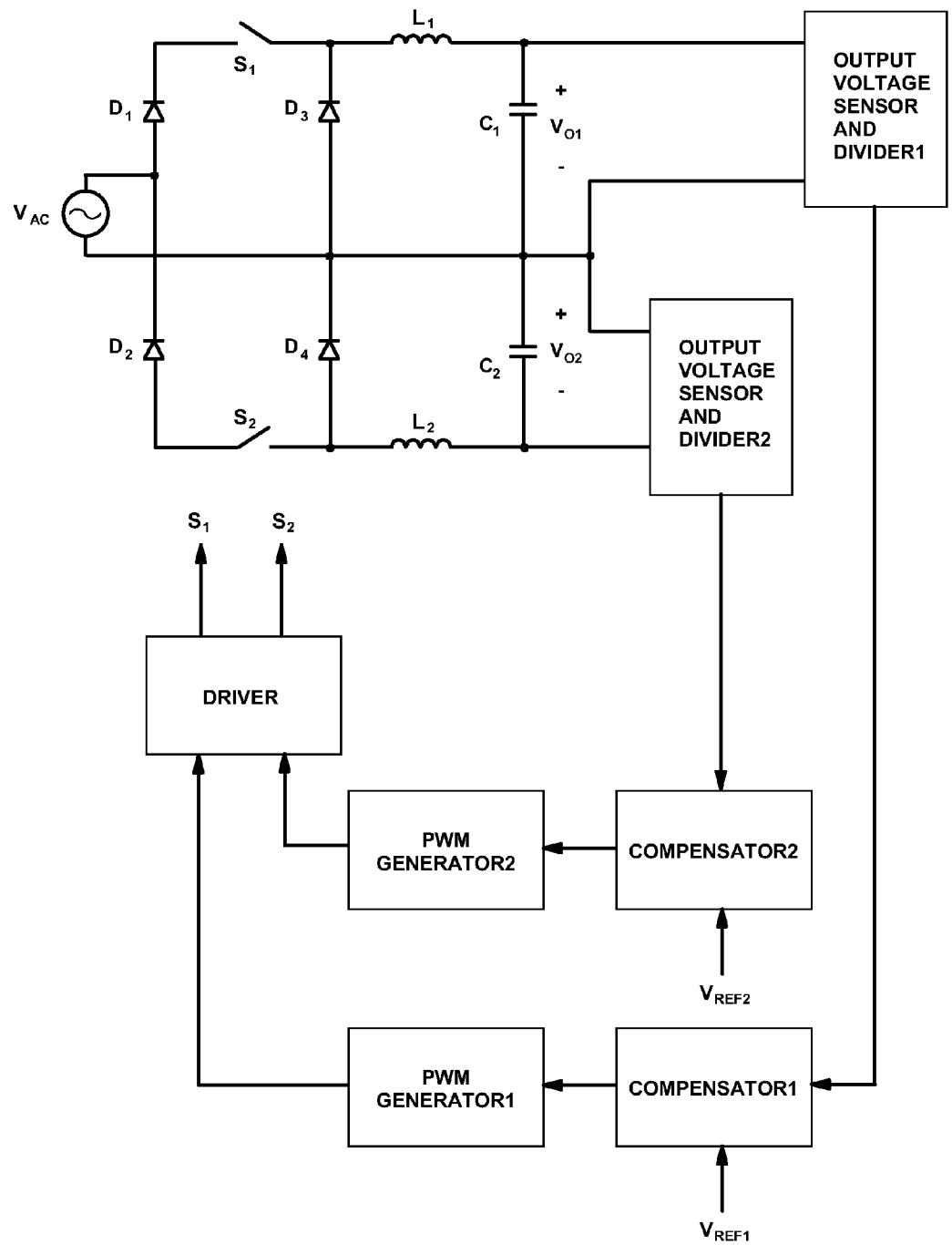
FIG. 35 shows a PFC rectifier having two feedback controllers that regulate two output capacitor voltages individually.
Figure 36:
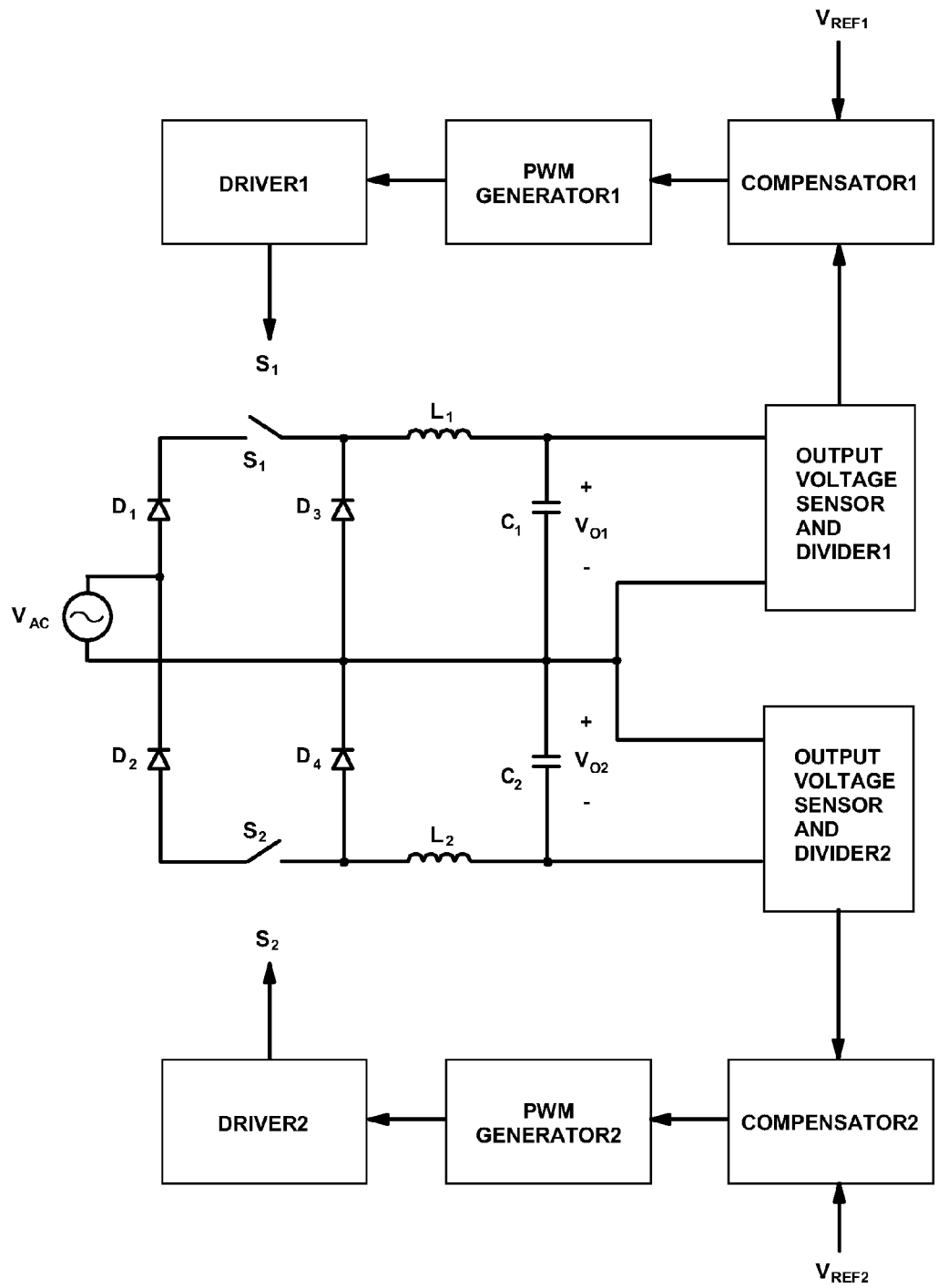
FIG. 36 shows a PFC rectifier having two feedback controllers that regulate two output capacitor voltages individually.

To individually regulate the voltages across output capacitors $C_1$ and $C_2$, two feedback control circuits are required as shown in FIGS. 35 and 36. One of the advantages of the control schemes shown in FIGS. 35 and 36 over the control scheme shown in FIG. 34 is an active voltage balance between output capacitors $C_1$ and $C_2$.

Figure 37:
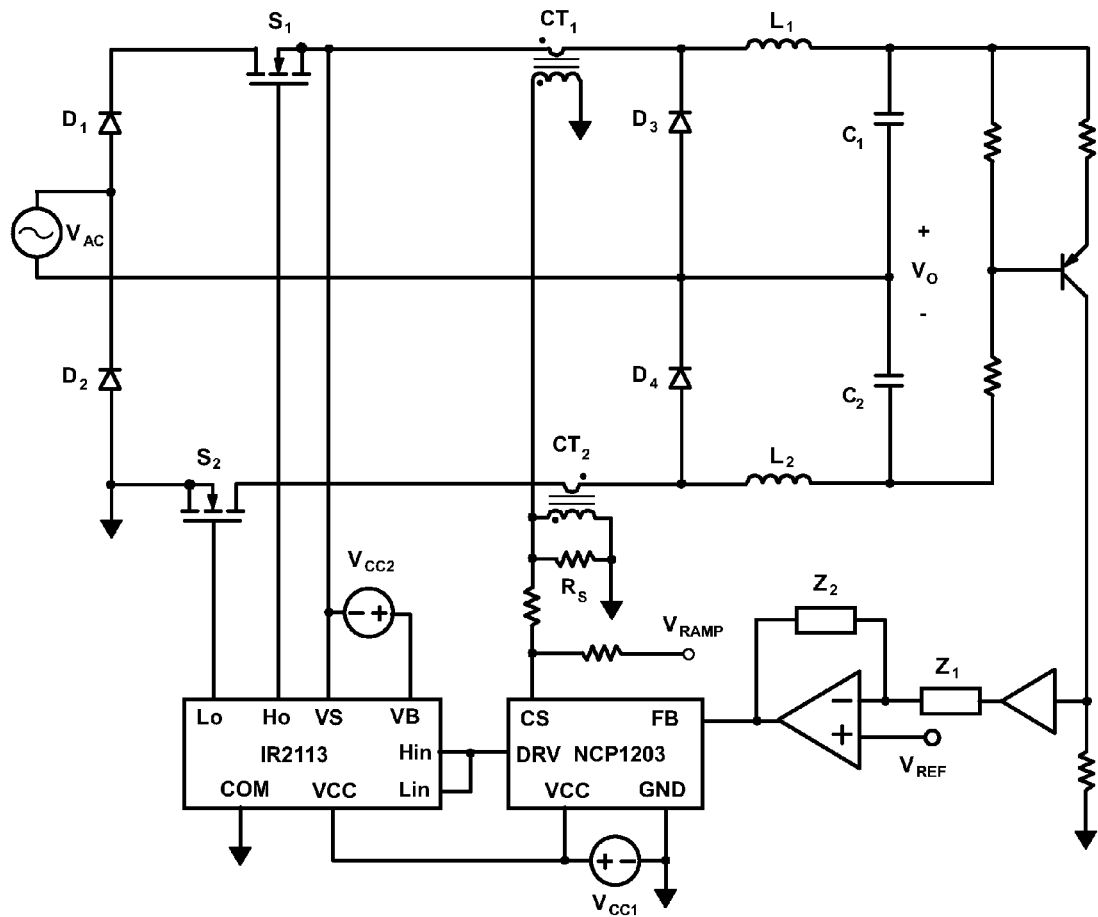
FIG. 37 shows an example of circuit implementation of the feedback controller in FIG. 34.
Figure 38:
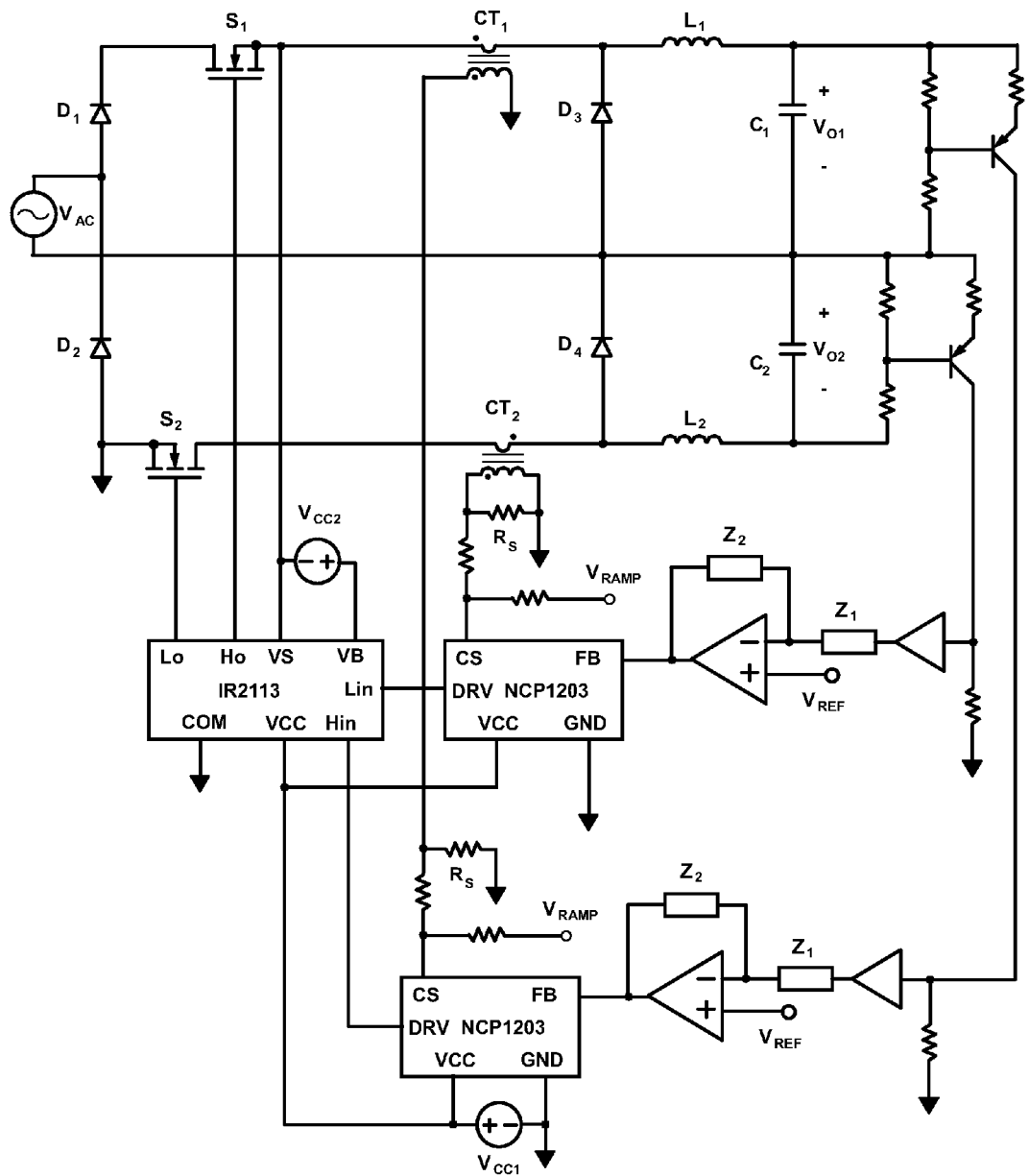
FIG. 38 shows an example of circuit implementation of the feedback controller in FIG. 35.
Figure 39:
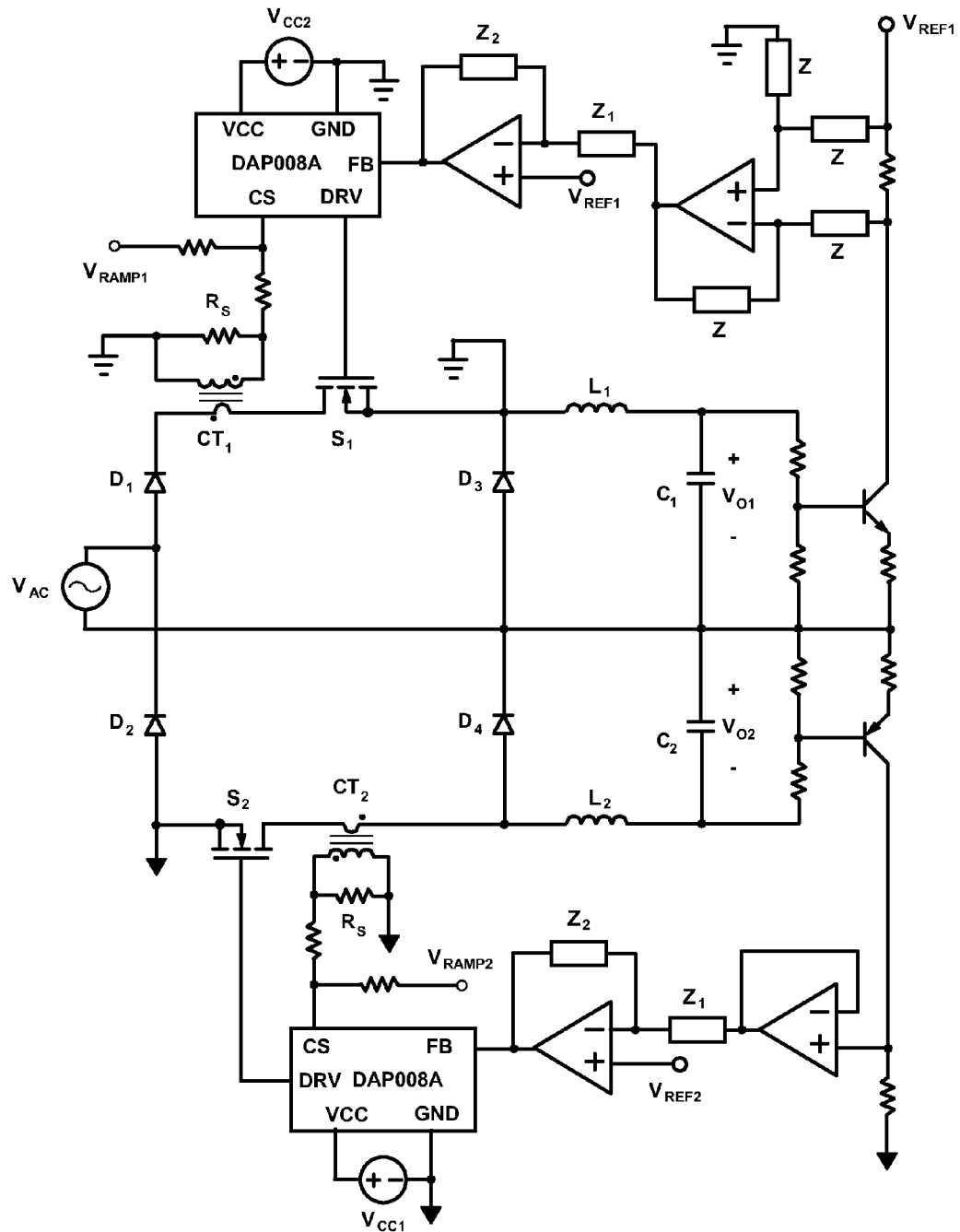
FIG. 39 shows an example of circuit implementation of the feedback controllers in FIG. 36.

FIGS. 37, 38, and 39 show examples of circuit implementation of the feedback controllers shown in FIGS. 34, 35, and 36, respectively.

The output capacitor of the buck converter cannot be charged before the buck switch starts operate because the switch is located in series between the input source and the output capacitor. As a result, house keeping power that allows the buck switch to operate cannot be obtained from the output capacitor.

A commercially available control IC for off-line power supplies generally provides initial gate pulses for a short period of time before the house keeping power for the control IC is fully available. Although the buck switch starts operate, since the size of the output capacitors is generally large, the control IC cannot operate the buck switch long enough to reach required output voltage that can supply the house keeping power.

Figure 40:
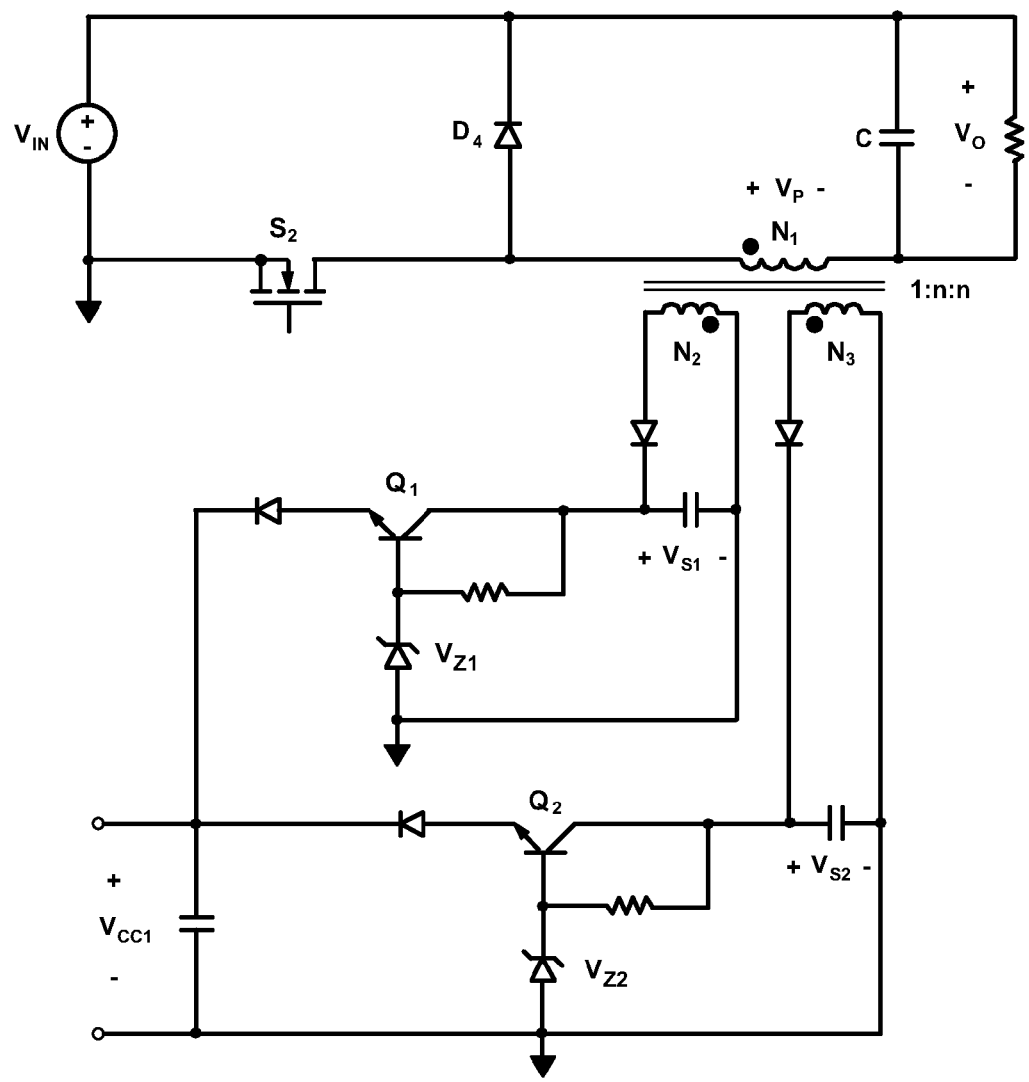
FIG. 40 shows a house keeping power supply circuit for a buck converter.
Figure 41:
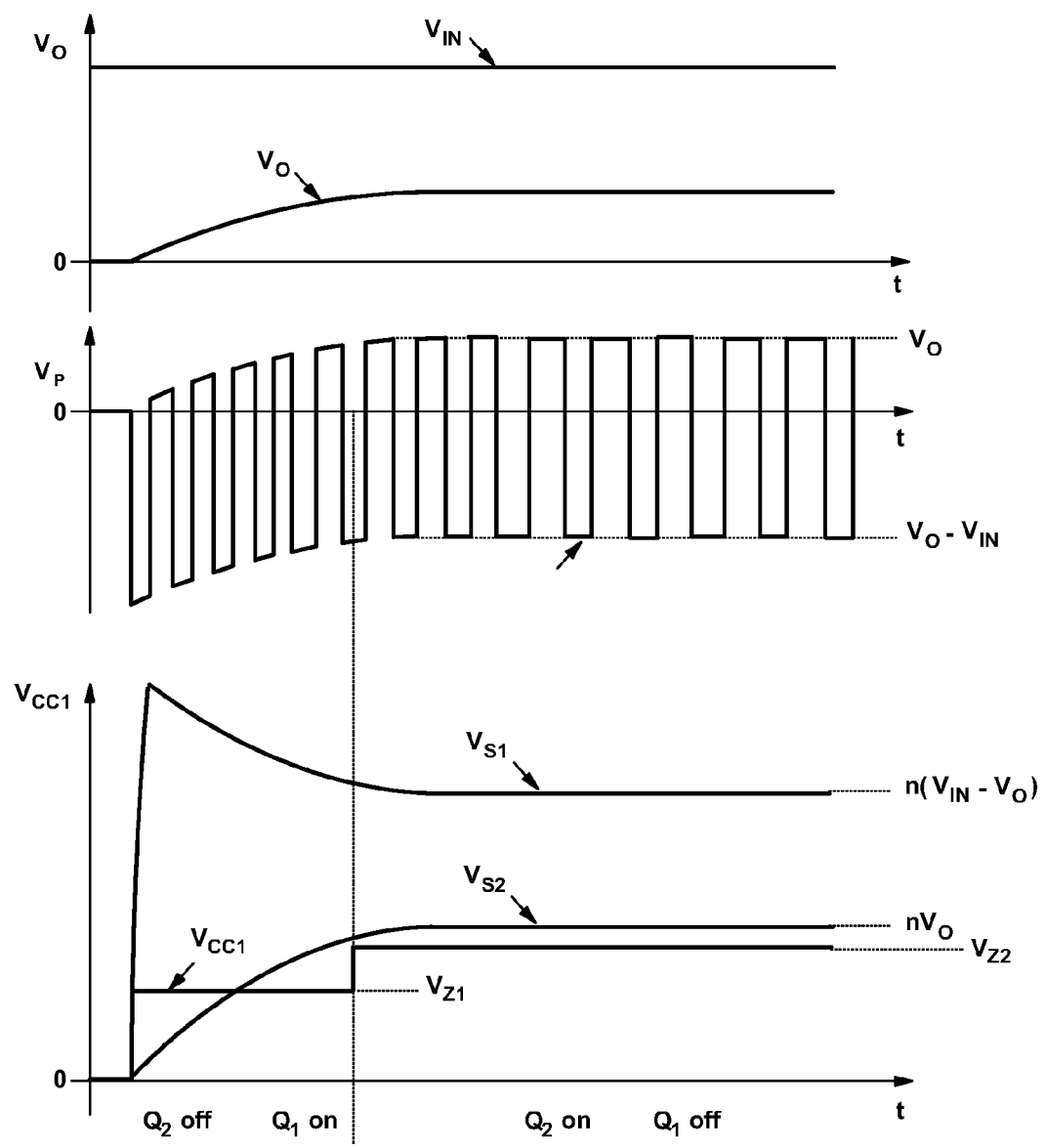
FIG. 41 illustrates timing waveforms of embodiment in FIG. 40.

FIG. 40 shows the proposed house keeping power supply circuit for a buck converter. It should be noted that the polarities of windings $N_1$, $N_2$, and $N_3$. The ideal waveforms of the house keeping power supply circuit in FIG. 40 are illustrated in FIG. 41. Voltage $V_{S1}$ that is equal to the peak voltage across winding $N_2$ is proportional to $V_{IN}$-$V_O$ as shown in FIG. 41. Because the voltage of output capacitor C is near zero during the start up, voltage $V_{S1}$ is proportional to input voltage $V_{IN}$ that can easily supply the required house keeping power until the output voltage increases to the required voltage level. If the output voltage reaches the required voltage level, switch $Q_1$ turns off and the house keeping power is delivered by voltage $V_{S2}$ that is proportional to the peak voltage across winding $N_3$, which represents output voltage $V_O$ times turns ratio n as shown in FIG. 41.

Figure 42:
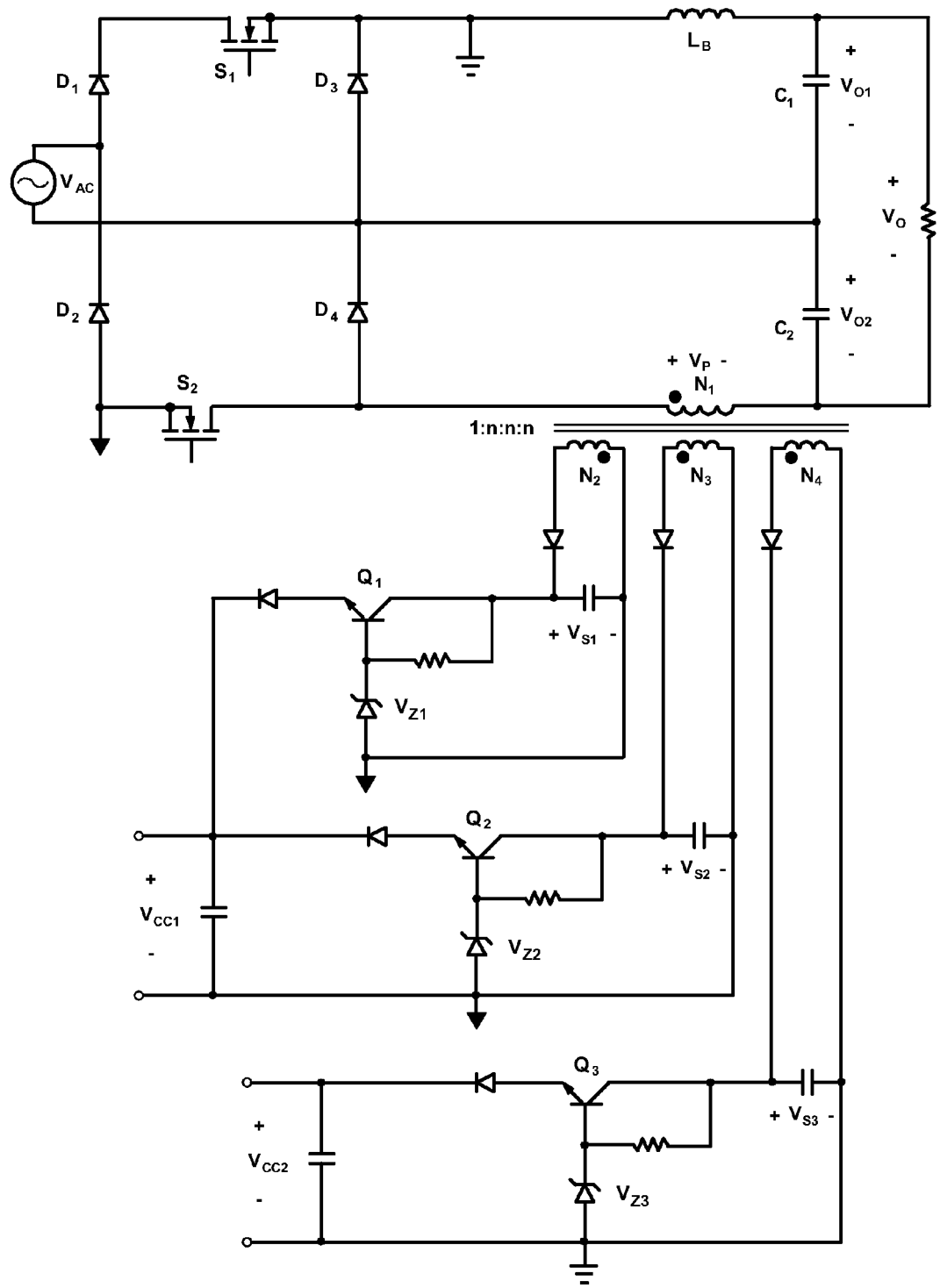
FIG. 42 shows a house keeping power supply circuit for a PFC rectifier.
Figure 43:
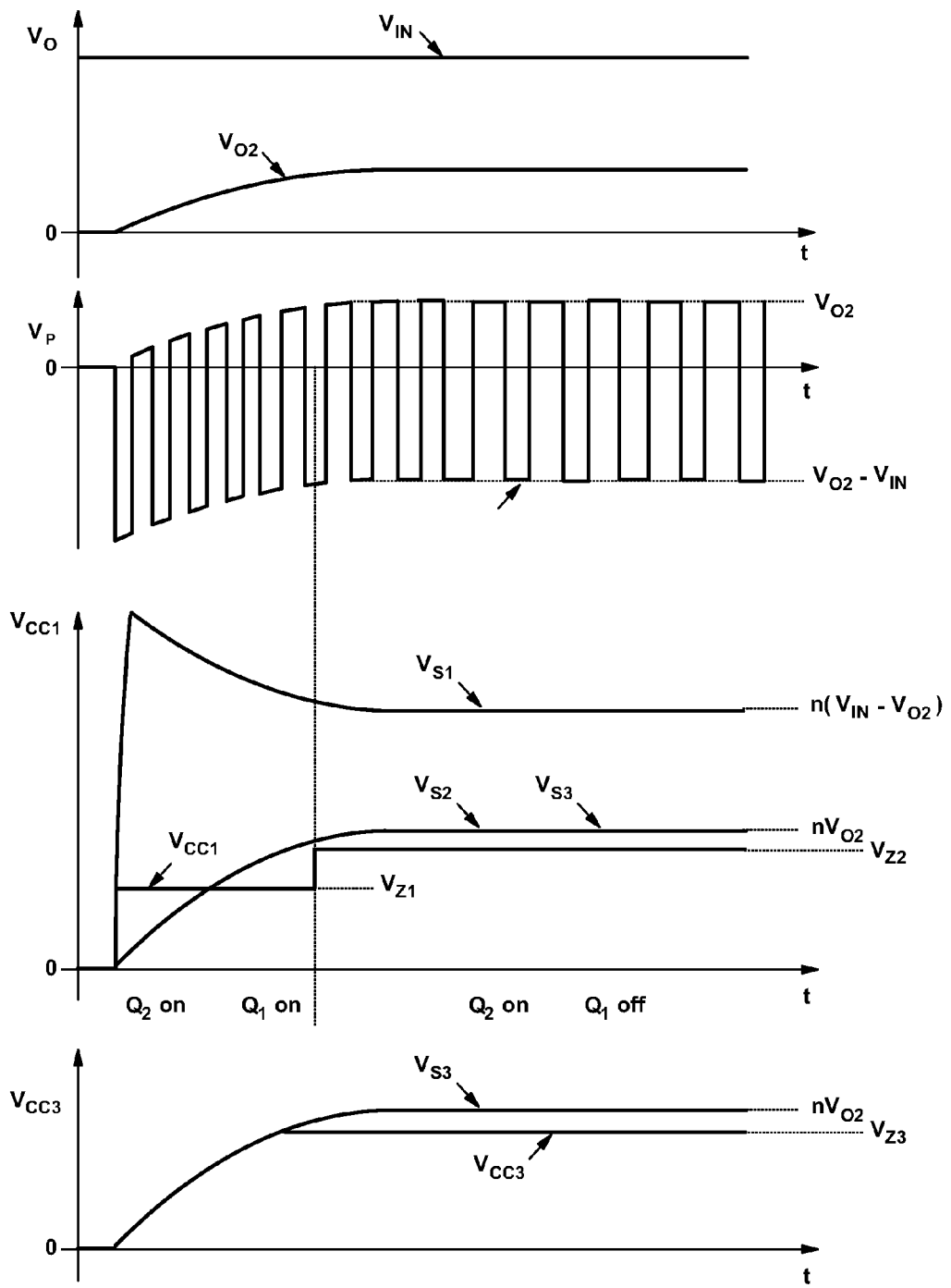
FIG. 43 illustrates timing waveforms of embodiment in FIG. 42.

FIG. 42 shows a proposed house keeping power supply circuit for the bridgeless PFC buck voltage-doubler rectifier while FIG. 43 illustrates timing waveforms for embodiment in FIG. 42. Voltage $V_{CC1}$ that supplies the house keeping power for the bridgeless PFC buck voltage-doubler rectifier is established the same way as that explained for the buck converter shown in FIG. 40. Additional voltage source $V_{CC2}$ for the operation of switch $S_1$ is obtained by winding $N_4$.

Figure 44:
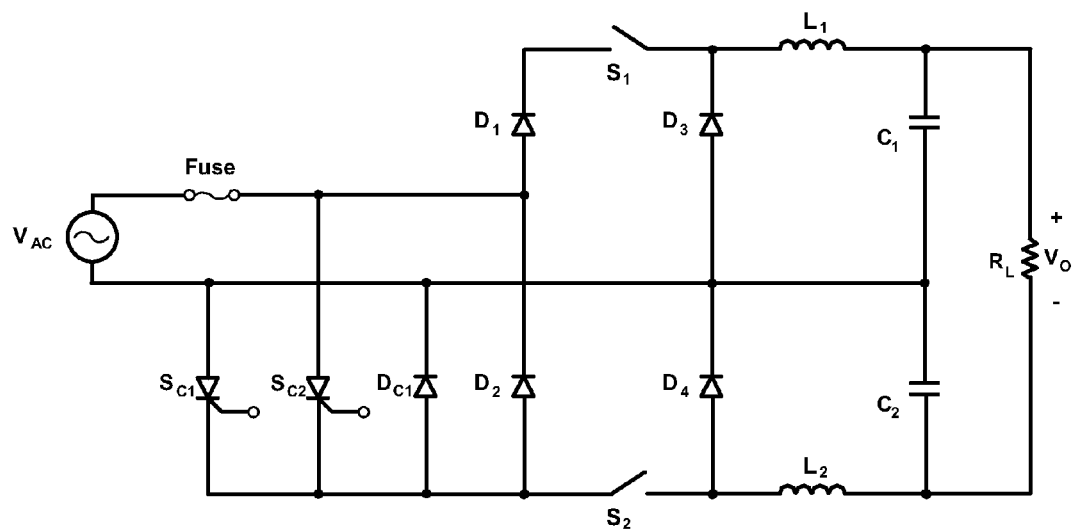
FIG. 44 shows a PFC rectifier having an implementation of a crowbar circuit.
Figure 45:
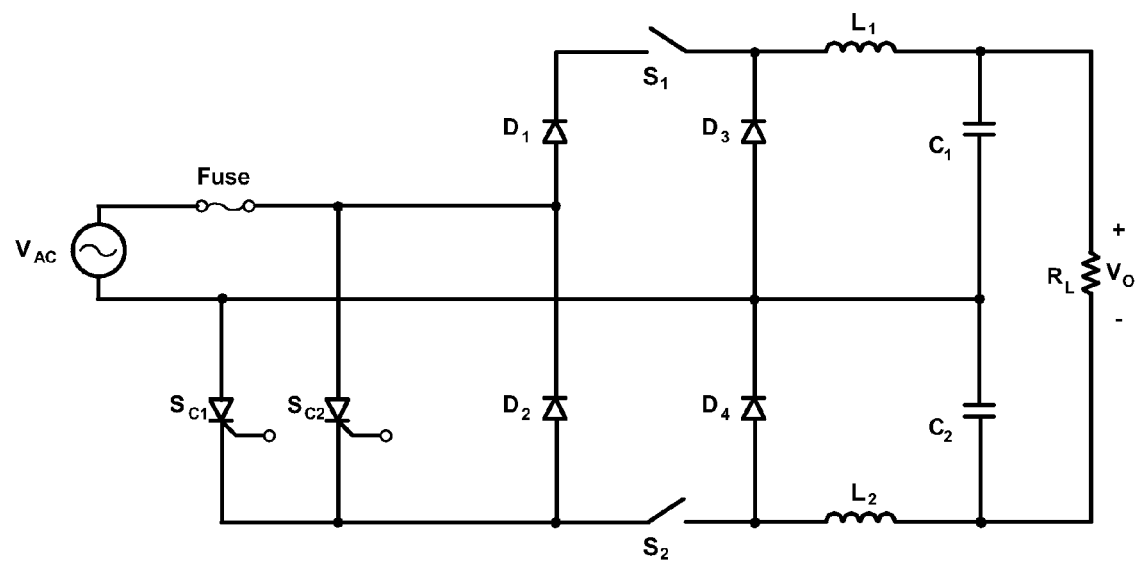
FIG. 45 shows a PFC rectifier having another implementation of a crowbar circuit.
Figure 46:
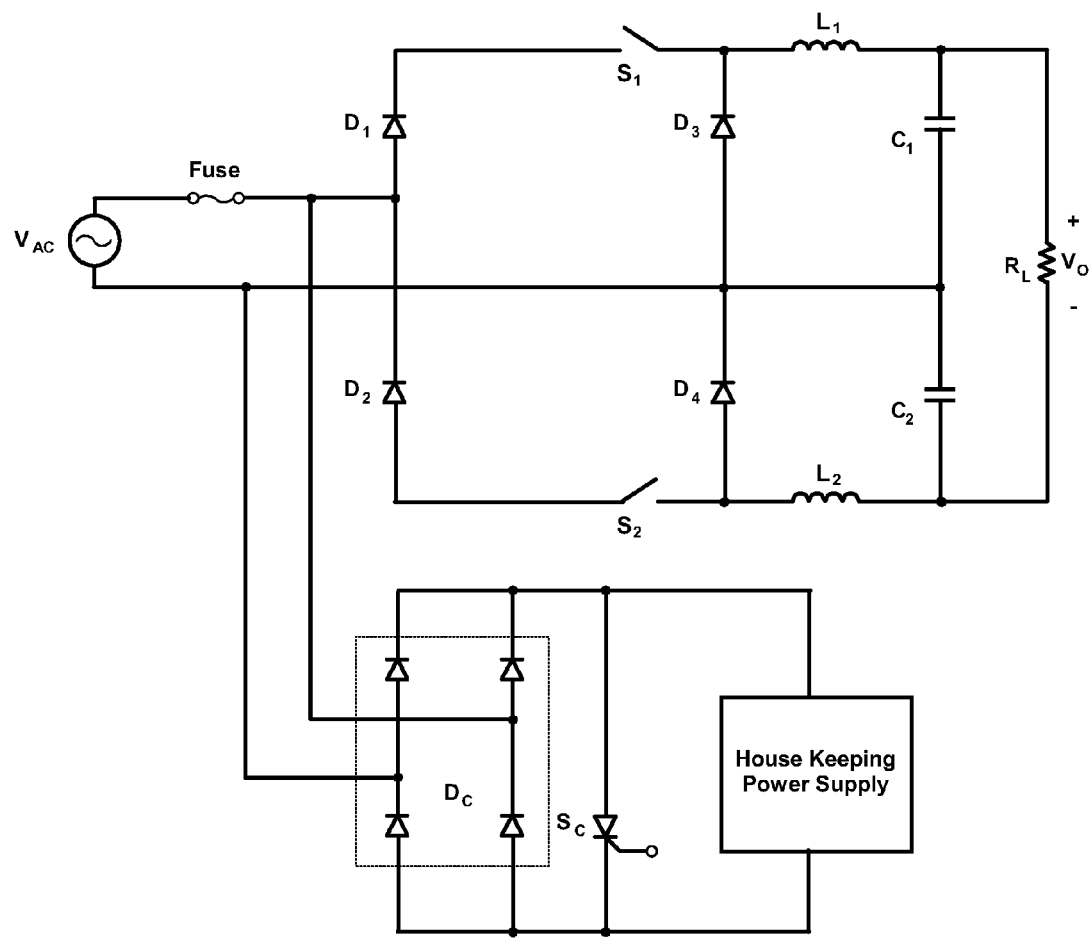
FIG. 46 shows a PFC rectifier having yet another implementation of a crowbar circuit.

Because the output voltage of a buck converter is always lower than the input voltage, second-stage circuits connected to the output of the buck converter may consist of low voltage rated devices. As a result, if the buck switch is failed short and the input-side fuse doesn't quickly blow open, the second-stage devices may not be well protected. To guarantee the device protection under such conditions, the input-side fuse should blow open whenever the output voltage exceeds the second-stage device rating. FIG. 44 shows a bridgeless PFC buck voltage-doubler rectifier having an implementation of a crowbar circuit. If the output voltage exceeds the device rating, switches $S_{C1}$ and $S_{C2}$ turn on immediately and make the input-side fuse blow open. FIGS. 45 and 46 show a bridgeless PFC buck voltage-doubler rectifier having other implementations of a crowbar circuit.

Figure 47:
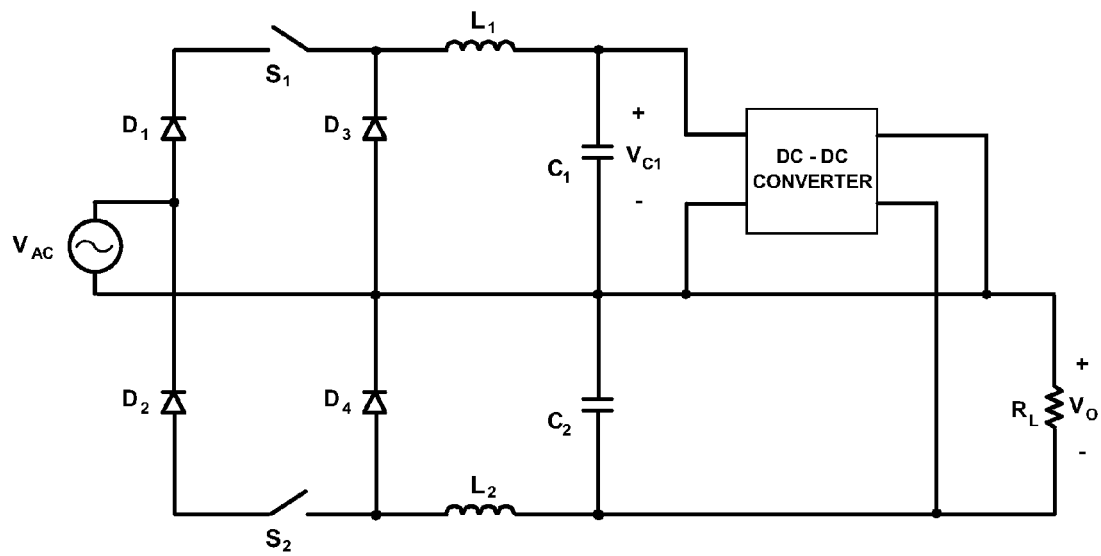
FIG. 47 shows a PFC rectifier having a dc-dc converter for a tight output voltage regulation.
Figure 48:
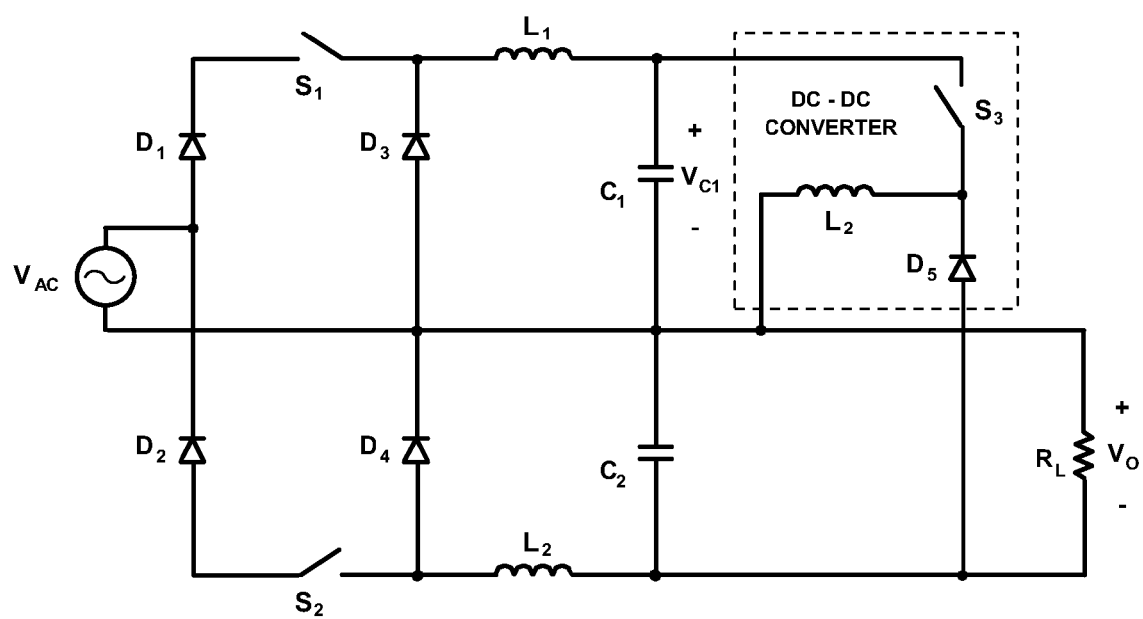
FIG. 48 shows an example of circuit implementation of the dc-dc converter in FIG. 47.
Figure 49:
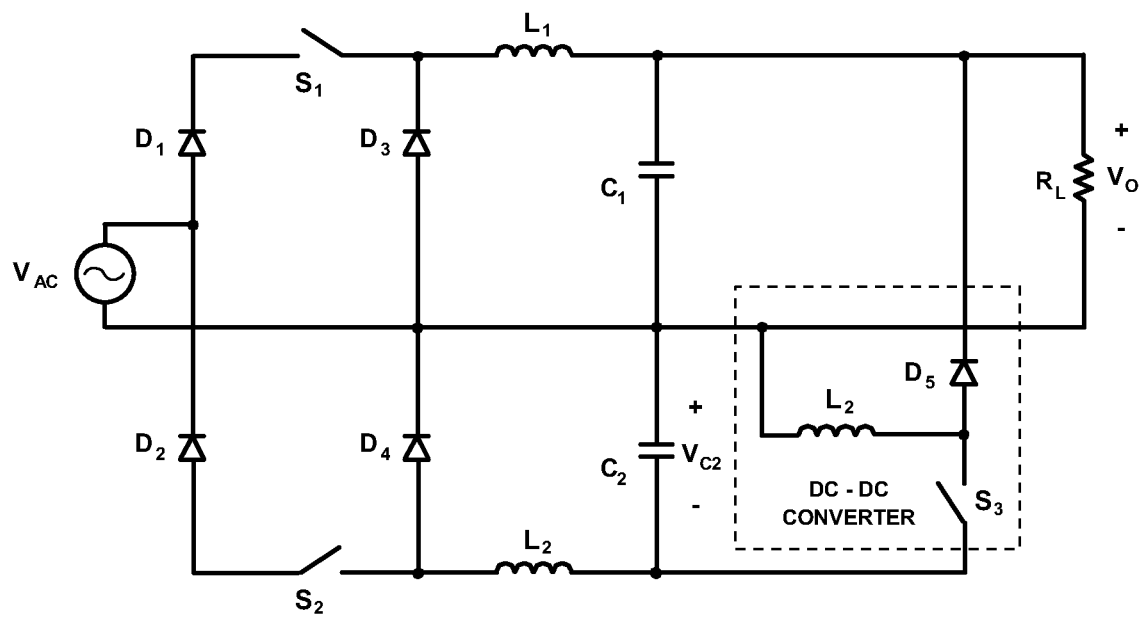
FIG. 49 shows another example of circuit implementation of the dc-dc converter in FIG. 47.

Generally, PFC rectifier has a very slow voltage feedback control circuit to achieve good power factor. Because of the slow voltage feedback, the output voltage waveform includes line frequency voltage ripple. Since the proposed bridgeless PFC buck voltage-doubler rectifier has two output capacitors, energy of one of the capacitors can be utilized to eliminate the line-frequency voltage ripple of the other capacitor voltage. One of the two capacitor voltages can be tightly regulated and utilized as output voltage. FIG. 47 shows a bridgeless PFC buck voltage-doubler rectifier having a dc-dc converter for a tight output voltage regulation. FIGS. 48 and 49 show examples of circuit implementation of the dc-dc converter in FIG. 47.

Based on the above description, the PFC rectifier according to the invention comprises a first converter having a first output capacitor and a second converter having a second output capacitor. The first and second capacitors are coupled to each other to increase the output voltage of the PFC rectifier. Depending on circuit configuration, the PFC can have linear input-to-output voltage gain, as shown in FIG. 3, or a nonlinear input-to-output voltage gain, as shown in FIG. 18.

A selection switch allows for the PFC rectifier to operate in either a nonlinear input-to-output voltage gain mode or linear input-to-output voltage gain mode, as shown in FIG. 24. FIG. 31 shows the first and second converters being configured to form a bi-directional ac-ac inverter.

As shown in FIG. 3 and 30, the first and second converters can be buck or buck-boost converters. As shown in FIG. 10, the buck converter can be a non-inverter buck converter. The first and second converters can share a common inductor, as shown in FIGS. 6, and 9. The common inductor can be serially coupled to one of the first or second output capacitors, as shown in FIG. 12.

As shown in FIG. 7, the first convert has a first inductor and the second converter has a second inductor that is magnetically coupled to the first inductor. FIG. 8 shows the second output capacitor is serially connected through the first output capacitor to increase the rectifier output voltage. The first and second converters have first and second input diodes and first and second switches that form a bi-directional switch, as shown in FIG. 14. FIG. 15 shows the bi-directional switch is coupled to a common inductor shared by the first and second converters.

The invention claimed is:

1. A power factor correction (PFC) rectifier, comprising:
   a plurality of rectifying diodes;
   a first converter coupled to an alternating current source (AC) having a cycle comprising a positive voltage period and a negative voltage period, the first converter having a first output capacitor; and
   a second converter coupled to the alternating current source (AC), the second converter having a second output capacitor coupled in series with the first output capacitor,
   wherein at least one of the first or second converters comprises a buck converter, and
   wherein only one rectifying diode is in series along a current path of the AC source during the positive voltage period and only one rectifying diode is in series along a current path of the AC source during the negative voltage period.

2. The PFC rectifier of claim 1, wherein at least one of the first or second converters comprises an inverted buck converter.

3. The PFC rectifier of claim 1, wherein at least one of the first or second converters comprises a buck-boost converter.

4. The PFC rectifier of claim 1, wherein at least one of the first or second converters comprises an inverted buck-boost converter.

5. The PFC rectifier of claim 1, wherein the first and second converters share a common inductor.

6. The PFC rectifier of claim 5, wherein the common inductor is serially coupled to one of the first or second output capacitors.

7. The PFC rectifier of claim 1, wherein the first convert has a first inductor and the second converter has a second inductor that is magnetically coupled to the first inductor.

8. The PFC rectifier of claim 1, wherein the first and second converters have first and second input diodes and first and second switches that form a bi-directional switch.

9. The PFC rectifier of claim 8, wherein the bi-directional switch is coupled to a common inductor shared by the first and second converters.

10. The PFC rectifier of claim 8, wherein at least one of the first or second diodes is paralleled by a snubber capacitor.

11. The PFC rectifier of claim 1, wherein the PFC rectifier has a nonlinear input-to-output voltage gain.

12. The PFC rectifier of claim 11, wherein a selection switch allows the PFC rectifier to operate in either a nonlinear input-to-output voltage gain mode or linear input-to-output voltage gain mode.

13. The PFC rectifier of claim 1, wherein at least one of the first or second converters comprises a reverse voltage blocking switch device.

14. The PFC rectifier of claim 1, wherein the first and second converters form a bi-directional ac-ac inverter.

15. The PFC rectifier of claim 1, wherein the first output capacitor is coupled to a first output voltage sensor, and wherein the second output capacitor is coupled to a second output voltage sensor for controlling switching in at least one of the first and second converters.

16. The PFC rectifier of claim 1 further including a DC-DC converter having an input coupled to the first output capacitor and an output coupled to the second output capacitor.

* * * * *